US009039386B2

(12) United States Patent
Richardson et al.

(10) Patent No.: US 9,039,386 B2
(45) Date of Patent: May 26, 2015

(54) TIRE INFLATION SYSTEM

(71) Applicant: Aperia Technologies, South San Francisco, CA (US)

(72) Inventors: Brandon Richardson, San Francisco, CA (US); David Carlberg, San Francisco, CA (US); Agustus Shelander, San Francisco, CA (US)

(73) Assignee: Aperia Technologies, Inc., Burlingame, CA (US)

( * ) Notice: Subject to any disclaimer, the term of this patent is extended or adjusted under 35 U.S.C. 154(b) by 0 days.

(21) Appl. No.: 14/198,967

(22) Filed: Mar. 6, 2014

(65) Prior Publication Data
US 2014/0186195 A1 Jul. 3, 2014

Related U.S. Application Data

(63) Continuation of application No. 14/019,941, filed on Sep. 6, 2013, which is a continuation of application No. 13/797,826, filed on Mar. 12, 2013.

(60) Provisional application No. 61/613,406, filed on Mar. 20, 2012, provisional application No. 61/637,206, filed on Apr. 23, 2012, provisional application No. 61/672,223, filed on Jul. 16, 2012.

(51) Int. Cl.
*F04C 25/00* (2006.01)
*F04B 49/08* (2006.01)
(Continued)

(52) U.S. Cl.
CPC ............... *F04B 49/08* (2013.01); *F16H 25/08* (2013.01); *H02K 7/18* (2013.01); *F04B 9/042* (2013.01); *Y10T 74/2107* (2015.01);
(Continued)

(58) Field of Classification Search
CPC ....... F04C 25/00; B60C 23/12; B60C 23/003; B60C 23/00; B60C 23/001; F04B 9/042; F04B 9/04; F04B 17/00; F04B 49/08; B60S 3/047; F16F 15/1485; F16H 25/08; Y10T 74/2128; Y10T 74/2107
USPC ........... 417/211, 221, 231, 233; 152/419, 421
See application file for complete search history.

(56) References Cited

U.S. PATENT DOCUMENTS 1,358,524 A * 11/1920 Cooper ......................... 152/421
2,211,935 A 8/1940 Parker
(Continued)

FOREIGN PATENT DOCUMENTS

| WO | 2009034321 A | 3/2009 |
|---|---|---|
| WO | 2009110001 A1 | 9/2009 |
| WO | 2012012617 A | 1/2012 |

*Primary Examiner* — Peter J Bertheaud
*Assistant Examiner* — Dominick L Plakkoottam
(74) *Attorney, Agent, or Firm* — Jeffrey Schox; Diana Lin

(57) ABSTRACT

A tire inflation system including a drive mechanism having a rotational axis, a pump cavity positioned a radial distance away from the axis of rotation, and a force translator coupling the rotational axis to the pump cavity. The drive mechanism includes a cam comprising an arcuate bearing surface having a non-uniform curvature, the cam rotatable about the rotational axis, and an eccentric mass couple to the cam that offsets a center of mass of the drive mechanism from the rotational axis. The pump cavity is rotatably coupled to the cam, wherein the pump cavity includes an actuating element and a chamber. The force translator couples the arcuate bearing surface to the actuating element, wherein the force translator includes an axis having an arcuate position fixed to an arcuate position of the pump cavity.

24 Claims, 13 Drawing Sheets

(51) Int. Cl.
| | |
|---|---|
| *F16H 25/08* | (2006.01) |
| *H02K 7/18* | (2006.01) |
| *F04B 9/04* | (2006.01) |
| *B60C 23/00* | (2006.01) |
| *B60C 23/12* | (2006.01) |
| *F17D 3/00* | (2006.01) |
| *B60S 5/04* | (2006.01) |
| *F04B 17/00* | (2006.01) |
| *F16F 15/14* | (2006.01) |

(52) U.S. Cl.
CPC ............ *Y10T 74/2128* (2015.01); *F04C 25/00* (2013.01); *B60C 23/003* (2013.01); *B60C 23/12* (2013.01); *B60C 23/00* (2013.01); *F17D 3/00* (2013.01); *B60S 5/043* (2013.01); *F04B 17/00* (2013.01); *F16F 15/1485* (2013.01); *F04B 9/04* (2013.01); *B60C 23/001* (2013.01)

(56) References Cited

U.S. PATENT DOCUMENTS

| | | | |
|---|---|---|---|
| 2,415,618 A | 2/1947 | West | |
| 2,899,907 A | 8/1959 | Becher | |
| 2,962,119 A | 11/1960 | White | |
| 3,012,820 A | 12/1961 | King | |
| 3,047,339 A | 7/1962 | Hamer | |
| 3,152,553 A | 10/1964 | Sverker | |
| 3,175,507 A | 3/1965 | Sverker | |
| 3,249,059 A | 5/1966 | Renn | |
| 3,400,074 A | 9/1968 | Grenci | |
| 3,532,449 A | 10/1970 | Garton | |
| 3,730,215 A | 5/1973 | Conery et al. | |
| 3,886,974 A | 6/1975 | Bjorklund | |
| 3,981,633 A | 9/1976 | Wall | |
| 4,018,579 A | 4/1977 | Hofmann | |
| 4,030,300 A | 6/1977 | Thompson | |
| 4,095,923 A | 6/1978 | Cullis | |
| 4,121,472 A | 10/1978 | Vural et al. | |
| 4,157,530 A | 6/1979 | Merz | |
| 4,256,971 A | 3/1981 | Griffith | |
| 4,291,235 A | 9/1981 | Bergey, Jr. et al. | |
| 4,370,894 A | 2/1983 | Sturesson | |
| 4,460,006 A | 7/1984 | Kolze | |
| 4,536,668 A | 8/1985 | Boyer | |
| 4,606,710 A | 8/1986 | Maguire | |
| 4,637,152 A | 1/1987 | Roy | |
| 4,651,792 A * | 3/1987 | Taylor | 152/415 |
| 4,768,542 A | 9/1988 | Morris | |
| 4,807,487 A | 2/1989 | Seidl | |
| 4,819,593 A | 4/1989 | Bruener et al. | |
| 4,852,528 A | 8/1989 | Richeson et al. | |
| 4,893,459 A | 1/1990 | Orlando | |
| 4,895,199 A | 1/1990 | Magnuson et al. | |
| 4,910,148 A | 3/1990 | Sorensen et al. | |
| 4,922,984 A | 5/1990 | Dosjoub et al. | |
| 5,018,797 A | 5/1991 | Takata | |
| 5,052,456 A | 10/1991 | Dosjoub | |
| 5,173,038 A | 12/1992 | Hopfensperger et al. | |
| 5,201,968 A | 4/1993 | Renier | |
| 5,293,919 A | 3/1994 | Olney et al. | |
| 5,325,902 A | 7/1994 | Loewe et al. | |
| 5,342,177 A * | 8/1994 | Cheng | 417/233 |
| 5,370,711 A | 12/1994 | Audit et al. | |
| 5,375,984 A | 12/1994 | Wehling | |
| 5,388,470 A | 2/1995 | Marsh, Jr. | |
| 5,409,049 A | 4/1995 | Renier | |
| 5,413,159 A | 5/1995 | Olney et al. | |
| 5,429,927 A | 7/1995 | Afseth et al. | |
| 5,468,129 A | 11/1995 | Sunden et al. | |
| 5,482,447 A | 1/1996 | Sunden et al. | |
| 5,495,879 A | 3/1996 | Cabestrero | |
| 5,512,439 A | 4/1996 | Hornes et al. | |
| 5,525,493 A | 6/1996 | Hornes et al. | |
| 5,591,281 A | 1/1997 | Loewe | |
| 5,646,727 A | 7/1997 | Hammer et al. | |
| 5,667,606 A * | 9/1997 | Renier | 152/421 |
| 5,707,215 A | 1/1998 | Olney et al. | |
| 5,759,820 A | 6/1998 | Hornes et al. | |
| 5,894,757 A | 4/1999 | Sully | |
| 5,941,692 A * | 8/1999 | Olney et al. | 417/233 |
| 5,941,696 A | 8/1999 | Fenstermacher et al. | |
| 6,092,545 A | 7/2000 | Bedore et al. | |
| 6,267,450 B1 | 7/2001 | Gamble | |
| 6,360,768 B1 | 3/2002 | Galler | |
| 6,463,798 B2 | 10/2002 | Niekerk et al. | |
| 6,474,832 B2 | 11/2002 | Murray | |
| 6,482,592 B1 | 11/2002 | Lundeberg et al. | |
| 6,494,693 B1 | 12/2002 | Sunden | |
| 6,742,386 B1 | 6/2004 | Larson | |
| 6,744,356 B2 | 6/2004 | Hamilton et al. | |
| 6,787,233 B1 | 9/2004 | Molteberg et al. | |
| 6,814,547 B2 | 11/2004 | Childers et al. | |
| 6,871,683 B2 | 3/2005 | Cobb | |
| 6,984,702 B2 | 1/2006 | Fonnum et al. | |
| 6,986,913 B2 | 1/2006 | Fonnum et al. | |
| 6,994,136 B2 | 2/2006 | Stanczak | |
| 7,117,731 B2 | 10/2006 | Hrabal | |
| 7,160,707 B2 | 1/2007 | Fonnum et al. | |
| 7,173,124 B2 | 2/2007 | Deggerdal et al. | |
| 7,217,762 B1 | 5/2007 | Joergedal et al. | |
| 7,222,487 B1 | 5/2007 | Hinkley | |
| 7,225,845 B2 | 6/2007 | Ellmann | |
| 7,237,590 B2 | 7/2007 | Loewe | |
| 7,255,323 B1 | 8/2007 | Kadhim | |
| 7,357,164 B2 | 4/2008 | Loewe | |
| 7,498,683 B2 | 3/2009 | Landwehr | |
| 7,506,663 B2 | 3/2009 | Thomas et al. | |
| 7,581,576 B2 * | 9/2009 | Nakano | 152/421 |
| 7,607,465 B2 | 10/2009 | Loewe | |
| 7,614,474 B2 | 11/2009 | Yang | |
| 7,625,189 B2 | 12/2009 | Cheng | |
| 7,704,057 B2 | 4/2010 | Malbec et al. | |
| 7,748,422 B2 | 7/2010 | Bol | |
| 7,763,689 B2 | 7/2010 | Fonnum et al. | |
| 7,784,513 B2 | 8/2010 | Loewe | |
| 7,810,582 B2 | 10/2010 | Webb | |
| 7,828,095 B2 | 11/2010 | Murata et al. | |
| 7,828,101 B2 | 11/2010 | Radtke et al. | |
| 7,847,421 B2 | 12/2010 | Gardner et al. | |
| 7,856,871 B2 | 12/2010 | Mancosu et al. | |
| 7,927,170 B2 | 4/2011 | Bickerton et al. | |
| 7,931,061 B2 | 4/2011 | Gonska et al. | |
| 7,931,817 B2 | 4/2011 | Bilski | |
| 7,975,789 B2 | 7/2011 | Murata | |
| 7,985,340 B2 | 7/2011 | Almaasbak et al. | |
| 7,989,614 B2 | 8/2011 | Deggerdal et al. | |
| 7,989,975 B2 | 8/2011 | Clement et al. | |
| 8,004,104 B2 | 8/2011 | Hench | |
| 8,022,561 B2 | 9/2011 | Ciglenec et al. | |
| 8,038,987 B2 | 10/2011 | Fonnum et al. | |
| 8,042,586 B2 | 10/2011 | Losey et al. | |
| 8,083,503 B2 | 12/2011 | Voltenburg, Jr. et al. | |
| 8,110,351 B2 | 2/2012 | Bosnes | |
| 8,113,254 B2 | 2/2012 | Benedict | |
| 8,747,084 B2 | 6/2014 | Richardson et al. | |
| 2004/0050760 A1 | 3/2004 | Siegfriedsen | |
| 2007/0040135 A1 | 2/2007 | Dyer et al. | |
| 2007/0151648 A1 | 7/2007 | Loewe | |
| 2008/0247883 A1 | 10/2008 | Yokomachi et al. | |
| 2009/0301575 A1 | 12/2009 | Arnett | |
| 2010/0243121 A1 | 9/2010 | Eigenbrode | |
| 2011/0061621 A1 | 3/2011 | Finkenbiner | |
| 2011/0308953 A1 | 12/2011 | Bazant et al. | |
| 2012/0020822 A1 | 1/2012 | Richardson et al. | |
| 2013/0251553 A1 * | 9/2013 | Richardson et al. | 417/321 |
| 2014/0186195 A1 | 7/2014 | Richardson et al. | |

* cited by examiner

TIRE INFLATION SYSTEM

CROSS-REFERENCE TO RELATED APPLICATIONS

This application is a continuation of U.S. patent application Ser. No. 14/019,941, filed 6 Sep. 2013, which is a continuation of U.S. patent application Ser. No. 13/797,826, filed 12 Mar. 2013, which claims the benefit of U.S. Provisional Application No. 61/613,406 filed 20 Mar. 2012, U.S. Provisional Application No. 61/637,206 filed 23 Apr. 2012, and U.S. Provisional Application No. 61/672,223 filed 16 Jul. 2012, which are incorporated in its entirety by this reference.

This application is also related to U.S. application Ser. No. 13/469,007 filed 10 May 2012, which is incorporated in its entirety by this reference.

TECHNICAL FIELD

This invention relates generally to the pumping field, and more specifically to a new and useful passive pump system in the pumping field.

BACKGROUND

Tires that are not optimally pressurized contribute to low fuel efficiency. These effects are particularly felt in the trucking industry, where long distances and large loads amplify the effects of an underinflated tire. However, it is often inconvenient and inefficient for truck drivers to constantly stop, check, and inflate the vehicle tires to the optimal pressure, leading to the persistence of less-than-optimal fuel efficiency in most trucks. This problem has led to several auto-inflating tire systems. Conventional auto-inflating tire systems are either central or distributed, but each suffers from its own set of drawbacks. Central inflation systems are complex and expensive, and require significant work for aftermarket installation (drilling through axles, tapping existing air lines, etc). Distributed systems are mounted at each wheel and can be less expensive, but the potential for reduced cost is typically at the expense of the continuous replacement of the device (which fails due to the harsh wheel environment).

Furthermore, passive pressurization systems can be desirable for tire inflation applications, as electrical energy storage mechanisms and programming can be eliminated from the system. However, conventional passive pressurization systems suffer from several problems. First, conventional passive pressurization systems using reciprocating pumps oftentimes suffer from fatigue due to the high pressures and high number of pumping cycles that are demanded. Second, passive pressurization systems can suffer from over-pressurization of the reservoir, wherein the pressurization system continues to pump fluid into the reservoir even after the desired reservoir pressure is reached. Conventional systems typically resolve this problem with a relief valve, wherein the relief valve vents the reservoir contents into the ambient environment when the reservoir pressure exceeds the desired pressure. This results in a loss of the already-pressurized fluid, resulting in additional pump cycles to bring fluid at ambient pressure up to the desired pressure, thereby resulting in a shorter pump lifetime. Third, conventional eccentric-mass driven pump systems, such as pendulum systems, experience instabilities when the rotating surface to which the eccentric mass is coupled rotates near the excitation frequency for the given eccentric mass. More specifically, the eccentric mass rotates with the system at this excitation frequency, resulting in radial oscillations that can be detrimental to the overall system or to the rotating surface to which the pump system is coupled.

Thus, there is a need in the pumping field to create a new and useful pump.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Pump System

Figure 1:
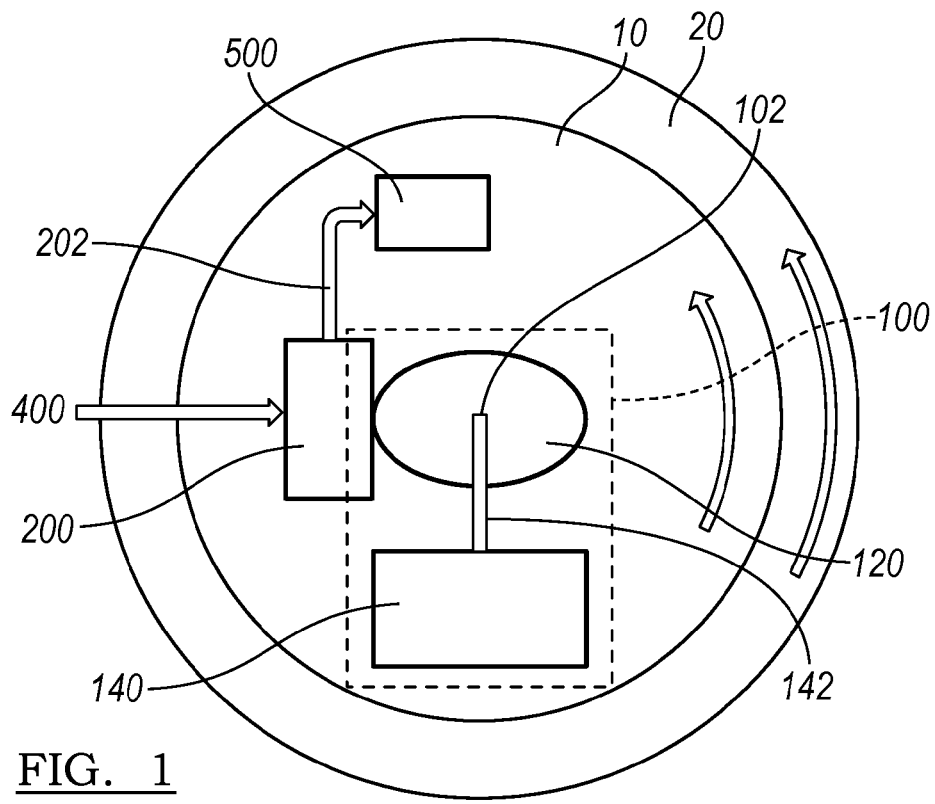
FIG. 1 is a schematic representation of the pump system coupled to a rotating surface.

As shown in FIG. 1, the pump system 10 includes a drive mechanism 100 including a cam 120 coupled to an eccentric mass 140, a primary pump 200 including a reciprocating element 220 and a pump body 240, and a force translator 300 coupling the cam 120 to the reciprocating element 220. The pump system 10 functions to translate rotational motion into linear motion. More preferably, the pump system 10 functions to translate relative motion between the primary pump 200 and cam 120 into a pumping force, wherein the eccentric mass 140 retains the cam position relative to a gravity vector while the primary pump 200 rotates relative to the cam 120 (e.g., with a rotating surface 20). The pump system 10 preferably additionally functions to pressurize the pumped fluid. The force translator 300 preferably translates the relative motion between the cam 120 and the primary pump 200 into the pumping force, which is preferably applied against the reciprocating element 220. More preferably, the force translator 300 moves the reciprocating element 220 through a compression stroke. The force translator 300 can additionally facilitate a recovery stroke (return stroke). However, the pump system 10 can alternatively convert the relative motion into linear force, electrical energy (e.g., via piezoelectric sensors, motion through an induced electric field, etc.), or any other suitable form of energy or motion. The pump system 10 is preferably passively controlled, but can alternatively be actively controlled, wherein the system further includes a power source, a plurality of sensors, and a controller that controls valve operation based on sensor measurements.

The pump system 10 is preferably couplable to a surface that rotates relative to a gravity vector (rotating surface 20). The rotating surface 20 is preferably a wheel of a vehicle, more preferably a truck, but can alternatively be any suitable rotating system, such as a windmill, waterwheel, or any other suitable rotating surface 20.

The pump system 10 preferably receives fluid from a first reservoir 400 and pumps the fluid into a second reservoir 500. The fluid received from the first reservoir 400 preferably has a first pressure, and the fluid pumped into the second reservoir 500 preferably has a second pressure higher than the first pressure but can alternatively have a pressure substantially similar to the first pressure. The fluid is preferably a gas, more preferably ambient air, but can alternatively be any other suitable gas, a liquid, or any other suitable fluid. The first reservoir 400 is preferably the ambient environment, but can alternatively be a fluid source (e.g., a fluid canister), an intermediary reservoir, or any other suitable reservoir. When the first reservoir 400 is an intermediary reservoir, the first reservoir 400 preferably receives fluid from a fluid source, such as the ambient environment or a fluid canister. The second reservoir 500 is preferably a tire interior, but can alternatively be any suitable reservoir. The pump system 10 can additionally treat the pumped fluid, preferably prior to primary pump ingress but alternatively after primary pump egress. The fluid is preferably treated (e.g., filtered) to remove debris, water, or any other suitable undesired component of the fluid. The fluid is preferably treated within the intermediary reservoir, when used. Alternatively, the fluid can be treated during primary pump ingress (e.g., wherein the inlet includes a filter) or at any suitable point within the fluid flow path.

The drive mechanism 100 of the pump system 10 functions to generate the pumping force and to control the magnitude of the pumping force. The pumping force (occluding force) is preferably a variable force applied in a radial direction from a rotational axis of the drive mechanism 100, but can alternatively be a constant force, a force applied at any suitable angle to the rotational axis, or any other suitable force. The drive mechanism 100 preferably includes the cam 120 and the eccentric mass 140. The drive mechanism 100 includes a rotational axis about which the drive mechanism 100 rotates relative to the primary pump 200 (conversely, about which the primary pump 200 rotates relative to the drive mechanism 100). The rotational axis of the drive mechanism 100 is preferably the rotational axis of the cam 120, but can alternatively be the rotational axis of the eccentric mass 140, the rotational axis about which the primary pump 200 rotates, or any other suitable rotational axis. The pump system 10 is preferably configured such that the rotational axis of the drive mechanism 100 is substantially aligned with the rotational axis of the rotating surface 20 when the pump system 10 is coupled to the rotating surface 20, but the pump system 10 can alternatively be configured such that the rotational axis of the drive mechanism 100 is offset from the rotational axis of the rotating surface 20. The drive mechanism 100 additionally includes a center of mass, determined from the mass and positions of the cam 120 and the eccentric mass 140. The eccentric mass 140 is preferably coupled to the cam 120 such that the center of mass of the drive mechanism 100 is offset from the rotational axis of the drive mechanism 100.

Figure 2A:
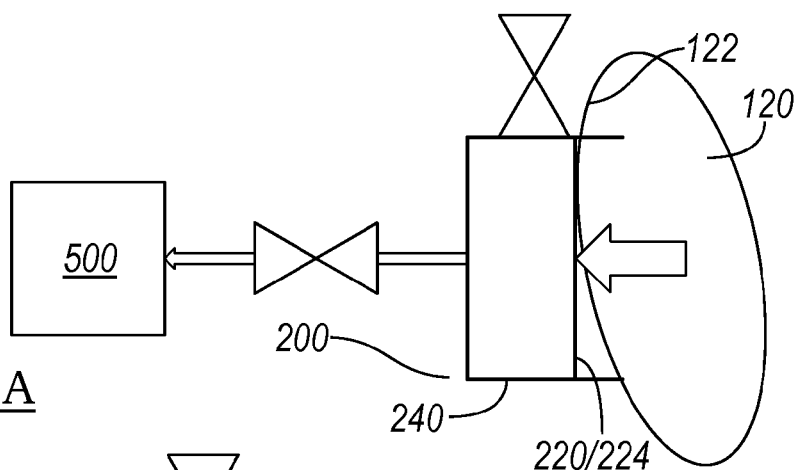
FIGS. 2A and 2B are schematic representations of a variation of the pump system in the recovered and compressed positions, respectively.
Figure 2B:
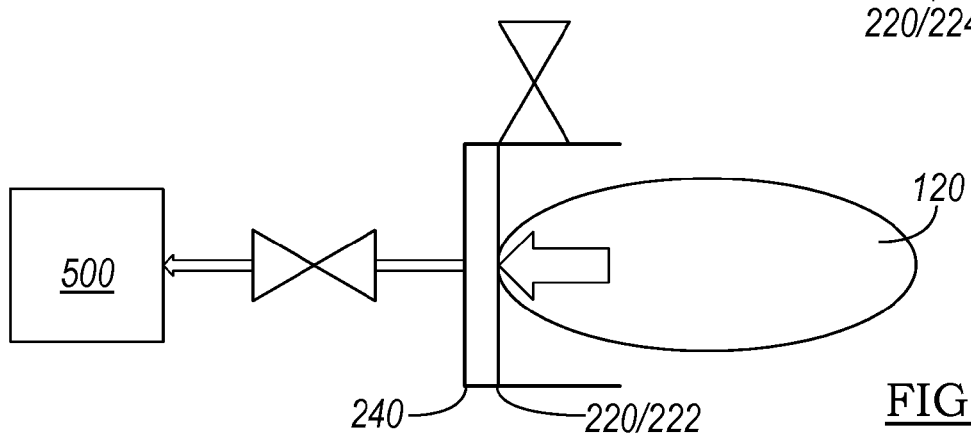
Figure 5A:
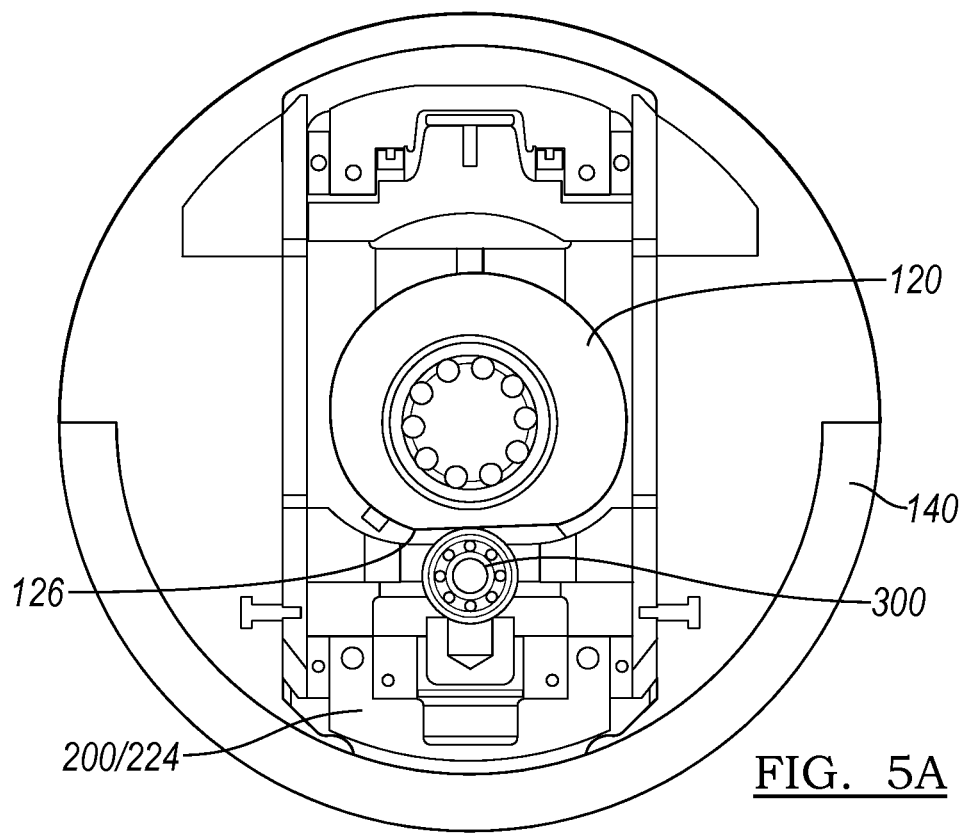
FIGS. 5A, 5B, and 5C are cutaway views of a variation of the pump system in the recovery stroke, at the beginning of the compression stroke, and at the end of the compression stroke, respectively.
Figure 5B:
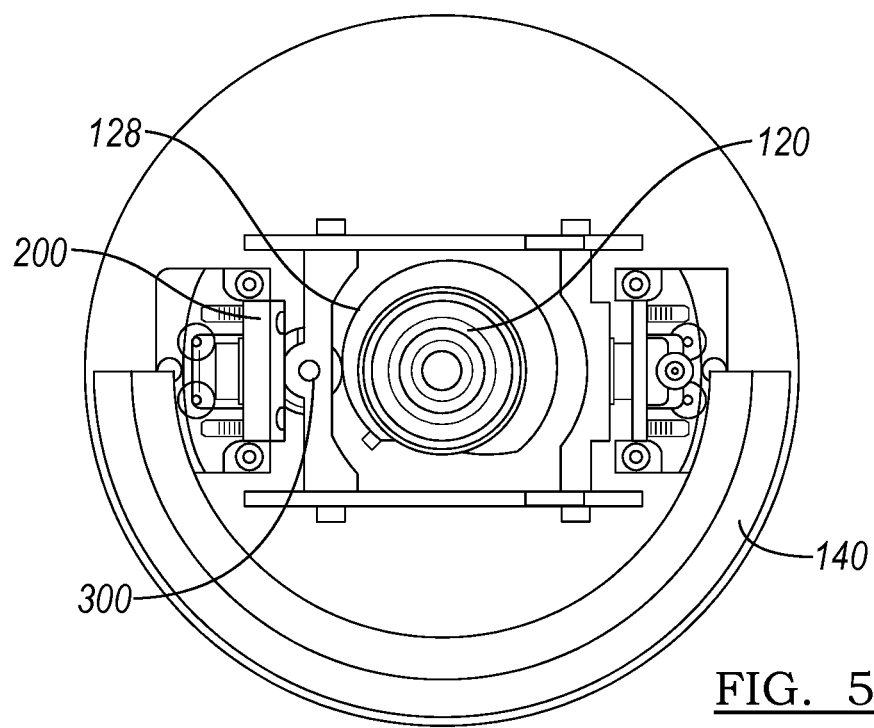
Figure 5C:
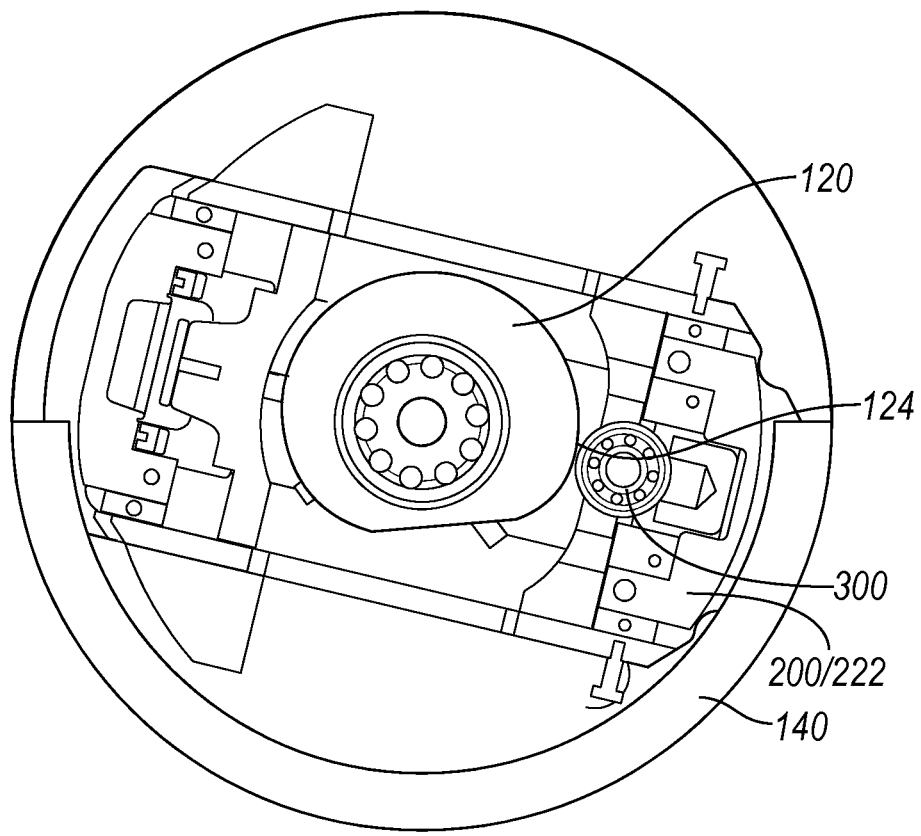
Figure 6:
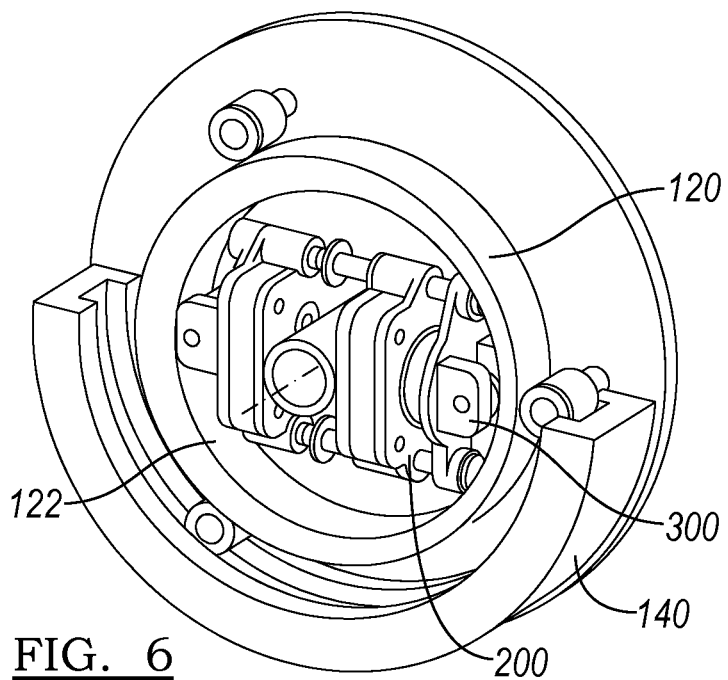
FIG. 6 is a perspective view of a variation of the pump system.

The cam 120 of the drive mechanism 100 functions to control the magnitude of the pumping force. The cam 120 preferably functions to provide a substantially constant torque against the reciprocating element 220 throughout the compression stroke, but can alternatively provide a variable torque against the reciprocating element 220 throughout the compression or recovery strokes. The cam 120 preferably includes a bearing surface 122, wherein the profile of the bearing surface 122 preferably controls the magnitude of the pumping force throughout the compression stroke. The bearing surface 122 is preferably continuous, but can alternatively be discontinuous. The bearing surface 122 is preferably defined on the exterior of the cam 120 (exterior bearing surface or outer bearing surface) but can alternatively be defined within the interior of the cam 120 (interior bearing surface or inner bearing surface), as shown in FIG. 6, wherein the bearing surface 122 defines a lumen within the cam 120. The bearing surface 122 is preferably arcuate, and preferably has a non-uniform curvature (e.g., an oblong profile or a reniform profile, as shown in FIGS. 2 and 5, respectively). Alternatively, the bearing surface 122 can have a uniform curvature (e.g., a circular profile), an angular profile, or any other suitable profile. The bearing surface 122 preferably includes a compression portion and a recovery portion, corresponding to the compression stroke and the recovery stroke of the primary pump 200, respectively. The compression portion is preferably continuous with the recovery section, but can alternatively be discontinuous. The bearing surface 122 preferably has a first section 124 having a high curvature (preferably positive curvature or convex but alternatively negative curvature or concave) adjacent a second section 126 having low curvature (e.g., substantially flat or having negative curvature compared to the first section 124). The bearing surface 122 preferably additionally includes a third section 128 connecting the first and second sections, wherein the third section 128 preferably provides a substantially smooth transition between the first and second sections by having a low curvature adjacent the first section 124 and a high curvature adjacent the second section 126. The compression portion preferably begins at the end of the second section 126 distal the first section 124, extends along the third section 128, and ends at the apex of the first section 124, as shown in FIG. 5B. The compression portion is preferably convex (e.g., when the bearing surface 122 is an external bearing surface), but can alternatively be concave. The apex of the first section 124 preferably corresponds to the top of the compression stroke (compressed position 222), as shown in FIG. 5C. The recovery portion preferably begins at the apex of the first section 124, extends along the second section 126, and ends at the end of the second section 126 distal the first section 124, as shown in FIG. 5A. The recovery portion is preferably substantially flat or concave (e.g., when the bearing surface 122 is an external bearing surface 122), but can alternatively be convex. The end of the second section 126 preferably corresponds to the bottom of the recovery stroke (recovered position 224). The slope of the compression portion is preferably less than 30 degrees, but can alternatively have any suitable angle. When a roller is used as the force translator 300, the curvature of the bearing surface 122 is preferably at least three times larger than the roller curvature or roller diameter, but can alternatively be larger or smaller. However, the bearing surface 122 can have any suitable profile. The cam 120 is preferably substantially planar with the bearing surface 122 defined along the side of the cam 120, in a plane normal to the rotational axis of the cam 120 (e.g., normal the broad face of the cam 120). The bearing surface 122 is preferably defined along the entirety of the cam side, but can alternatively be defined along a portion of the cam side. The generated pump force is preferably directed radially outward of the rotational axis, more preferably along a plane normal to the rotational axis. Alternatively, the cam 120 can have a rounded or otherwise profiled edge segment (transition between the cam broad face and the cam side), wherein the bearing surface 122 can include the profiled edge. Alternatively, the arcuate surface is defined by a face of the cam parallel to the rotational axis of the cam 120, wherein the generated pump force can be directed at any suitable angle relative to the rotational axis, varying from parallel to the rotational axis to normal to the rotational axis. The compression portion preferably encompasses the majority of the cam profile, but can alternatively encompass half the cam profile or a small portion of the cam profile. In one variation, the compression portion covers 315 degrees of the cam profile, while the recovery portion covers 45 degrees of the cam profile. However, the compression and recovery portions can cover any other suitable proportion of the cam profile.

Figure 4A:
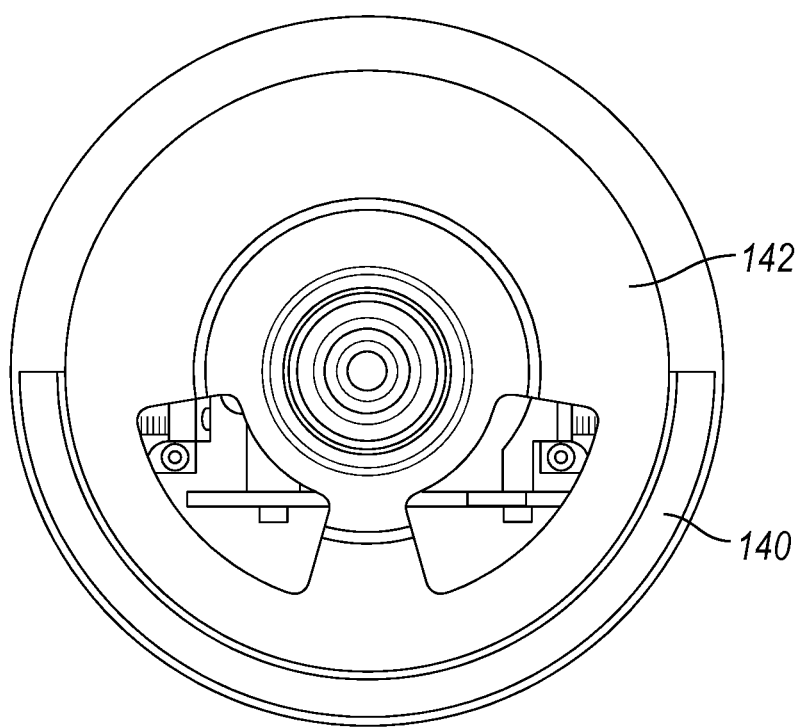
FIGS. 4A and 4B are sectional views of a variation of the pump system with the mass couple and with the mass couple cut away, respectively.
Figure 4B:
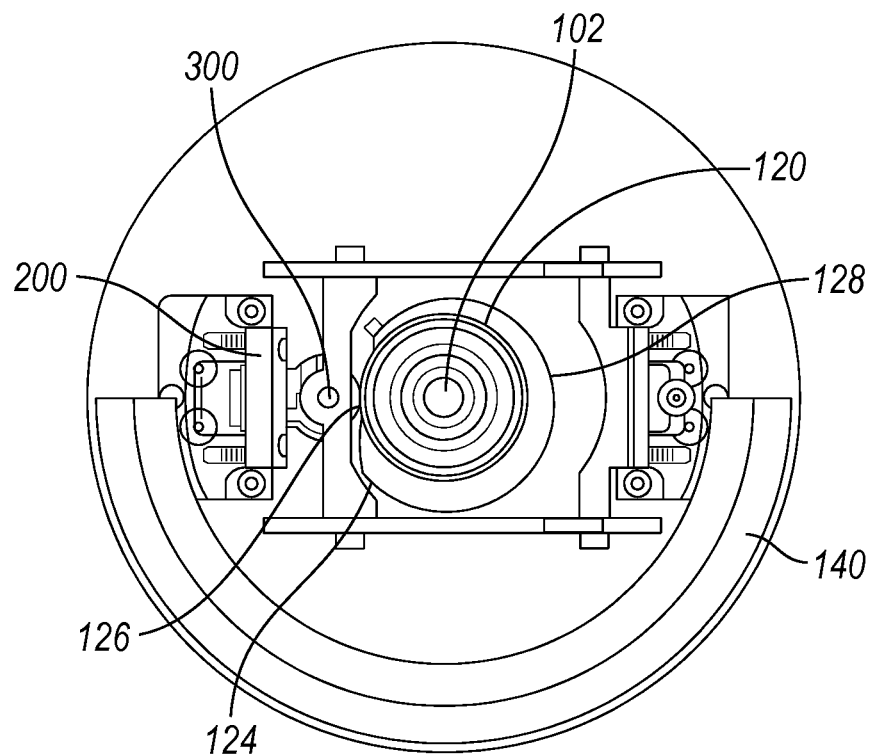

The eccentric mass 140 (hanging mass) of the drive mechanism 100 functions to offset the center of mass of the drive mechanism 100 from the rotational axis of the drive mechanism 100. This offset can function to substantially retain the angular position of the drive mechanism 100 relative to a gravity vector, thereby engendering relative motion between the drive mechanism 100 and the pump system components that are statically coupled to the rotating surface 20 (that rotates relative to the gravity vector). The eccentric mass 140 is preferably a substantially homogenous piece, but can alternatively be heterogeneous. The eccentric mass 140 is preferably a substantially singular piece, but can alternatively be made of multiple pieces or segments. In the latter variation, the multiple pieces are preferably substantially similar in shape, angular and radial position, and mass, but can alternatively be substantially different in profile, mass, angular position, or radial position. The eccentric mass 140 is preferably a distributed mass (e.g., extends along a substantial portion of an arc centered about the rotational axis, as shown in FIG. 4B), but can alternatively be a point mass. In certain applications, particularly those applications with high rotational speeds, the distributed mass can be preferable since the distributed mass results in low oscillation frequencies, thereby resulting in a lower likelihood of eccentric mass excitation into spinning with the system in response to a linear oscillation introduced into the system (e.g., bumps, system pulsation, etc.). The eccentric mass 140 is preferably curved, but can alternatively be substantially flat, angled, or have other suitable shape. The radius of the eccentric mass curvature is preferably maximized, such that the eccentric mass traces an arcuate section of the pump system perimeter. However, the eccentric mass 140 can have any other suitable curvature. The eccentric mass 140 preferably extends at least 90 degrees about the rotational axis of the drive mechanism 100, more preferably 180 degrees about the rotational axis, but can extend more or less than 180 degrees about the rotational axis. The eccentric mass 140 preferably has substantially more mass than the cam 120, but can alternatively have a substantially similar mass or a smaller mass. The eccentric mass 140 preferably imparts 2 in-lb (0.225 Nm) of torque on the cam 120, but can alternatively impart more or less torque.

The eccentric mass 140 is preferably a separate piece from the cam 120, and is preferably coupled to the cam 120 by a mass couple 142. Alternatively, the eccentric mass 140 can be incorporated into the cam 120, wherein the eccentric mass 140 is incorporated along the perimeter of the cam 120, incorporated into a half of the cam 120, or incorporated along any other suitable portion of the cam 120. The eccentric mass 140 can be statically coupled to the cam 120 or rotatably coupled to the cam 120. In the variation wherein the eccentric mass 140 is statically coupled to the cam 120, the eccentric mass 140 can be coupled to the cam 120 at the rotational axis of the cam 120, at the rotational axis of the drive mechanism 100, offset from the rotational axis of the cam 120, or at any other suitable portion of the cam 120. The eccentric mass 140 can be permanently connected to the cam 120. Alternatively, the eccentric mass 140 can be transiently connected (removably coupled) to the cam 120, wherein the eccentric mass 140 can be operable between a pumping mode wherein the eccentric mass 140 is coupled to the cam 120 and a non-pumping mode wherein the eccentric mass 140 is disconnected from the cam 120. The mass couple 142 preferably has a high moment of inertia, but can alternatively have a low moment of inertia. The mass couple 142 is preferably a disk (as shown in FIG. 4A), but can alternatively be a lever arm, plate, or any other suitable connection. The mass couple 142 preferably couples to the broad face of the cam 120, but can alternatively couple to the edge of the cam 120, along the exterior bearing surface of the cam 120, to the interior bearing surface of the cam 120, to an axle extending from of the cam 120 (wherein the cam 120 can be statically fixed to or rotatably mounted to the axle), or to any other suitable portion of the cam 120. The mass couple 142 can couple to the cam 120 by friction, by a transient coupling mechanism (e.g., complimentary electric or permanent magnets located on the cam 120 and mass couple 142, a piston, a pin and groove mechanism, etc.), by bearings, or by any other suitable coupling means. When the mass couple 142 couples to the cam 120 by a transient coupling mechanism, the mass couple 142 is preferably operable between a coupled mode, wherein the mass couple 142 connects the eccentric mass 140 to the cam 120, and a decoupled mode, wherein the mass couple 142 disconnects the eccentric mass 140 from the cam 120. The mass couple 142 can additionally function as a shutoff mechanism, wherein the mass couple 142 is switched from the coupled mode to the decoupled mode in response to the detection of a shutoff event (e.g., the reservoir pressure reaching a threshold pressure). In one variation, the mass couple 142 is a disk located within the lumen defined by an interior bearing surface of the cam 120, wherein the disk can rotate relative to the interior bearing surface in the decoupled mode and is coupled to the interior bearing surface by a friction element in the coupled mode. In another variation, the mass couple 142 is rotatably mounted on an axle extending from the cam 120 by bearings, wherein the mass couple 142 can be statically coupled to the cam 120 by one or more sets of magnets or pistons extending from the adjacent broad faces of the cam 120 and mass couple 142.

The primary pump 200 of the pump system 10 functions to pressurize a fluid with the pumping force generated between the cam 120 and the reciprocating element 220. The primary pump 200 is preferably a positive displacement pump including an actuating element and a pump cavity, and is more preferably a reciprocating pump, wherein the primary pump 200 includes a reciprocating element 220 and a pump body 240. The pump can include a chamber 260. The primary pump 200 preferably includes a lumen defined between the reciprocating element 220 and the pump body 240, wherein the lumen is preferably substantially fluid impermeable. The primary pump 200 is preferably rotatably coupled to the rotational axis of the drive mechanism 100. The primary pump 200 is preferably positioned a radial distance away from the rotational axis of the drive mechanism 100, wherein the radial position of the primary pump 200 is preferably fixed, but can alternatively be adjustable. More preferably, the primary pump 200 is preferably statically mounted to a housing (wherein the housing is statically coupled to the rotating surface 20) but can alternatively be transiently mounted to the housing (adjustably mounted). In operation, the primary pump 200 preferably rotates about the rotational axis. Throughout the rotation, the variable bearing surface profile preferably applies a variable force to the reciprocating element 220 as the distance between the bearing surface 122 and the pump body bottom varies. The primary pump 200 preferably includes an actuation axis, wherein the reciprocating element 220 preferably travels along the actuation axis through the compression stroke. The reciprocating element 220 can additionally travel along the same actuation axis during the return stroke. The primary pump 200 is preferably oriented such that the actuation axis is substantially normal to the rotational axis, but can alternatively be positioned such that the actuation axis is at any suitable angle to the rotational axis. The primary pump 200 and cam 120 preferably share a common plane, wherein the pumping force is preferably transmitted along the common plane, but can alternatively be substantially offset. The system preferably includes one primary pump 200, and more preferably includes two pump cavities. However, the pump system 10 can include any suitable number of pump cavities. When the pump system 10 includes multiple pump cavities, the pump cavities are preferably substantially evenly distributed about the rotational axis (e.g., have substantially similar distances between the respective angular positions), but can alternatively be unevenly distributed. The pump cavities preferably have substantially similar radial positions relative to the rotational axis, but can alternatively have different radial positions. The pump cavities can be substantially different (e.g., with different lumen volumes, different actuation areas, etc.) or can be substantially similar.

Figure 3A:
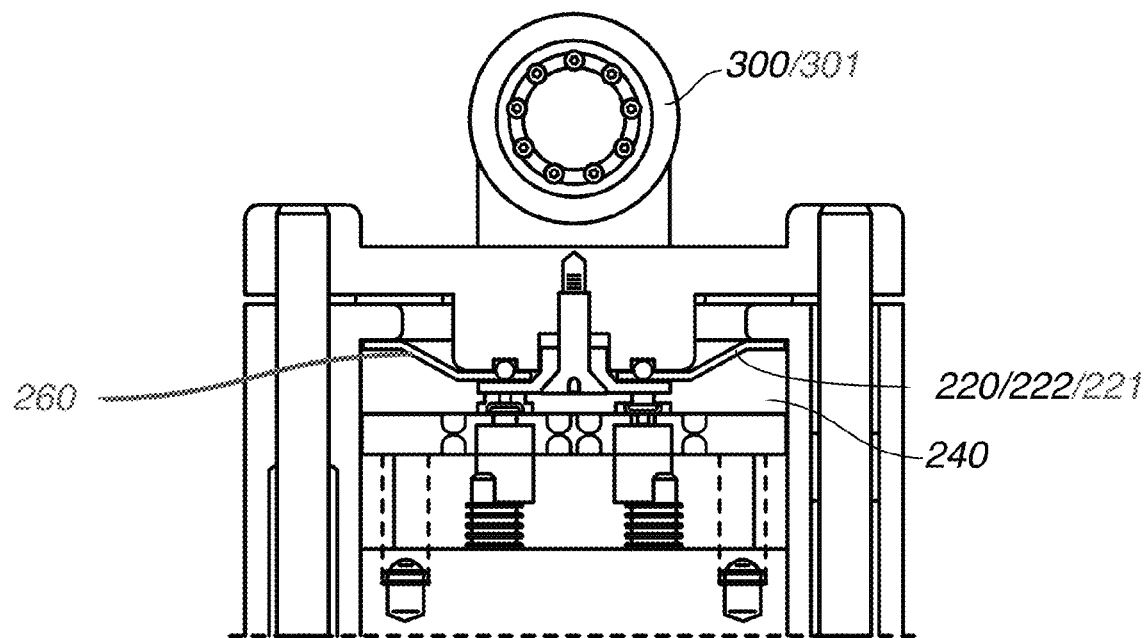
FIGS. 3A and 3B are cutaway views of a variation of the primary pump in the compressed and recovered positions, respectively.
Figure 3B:
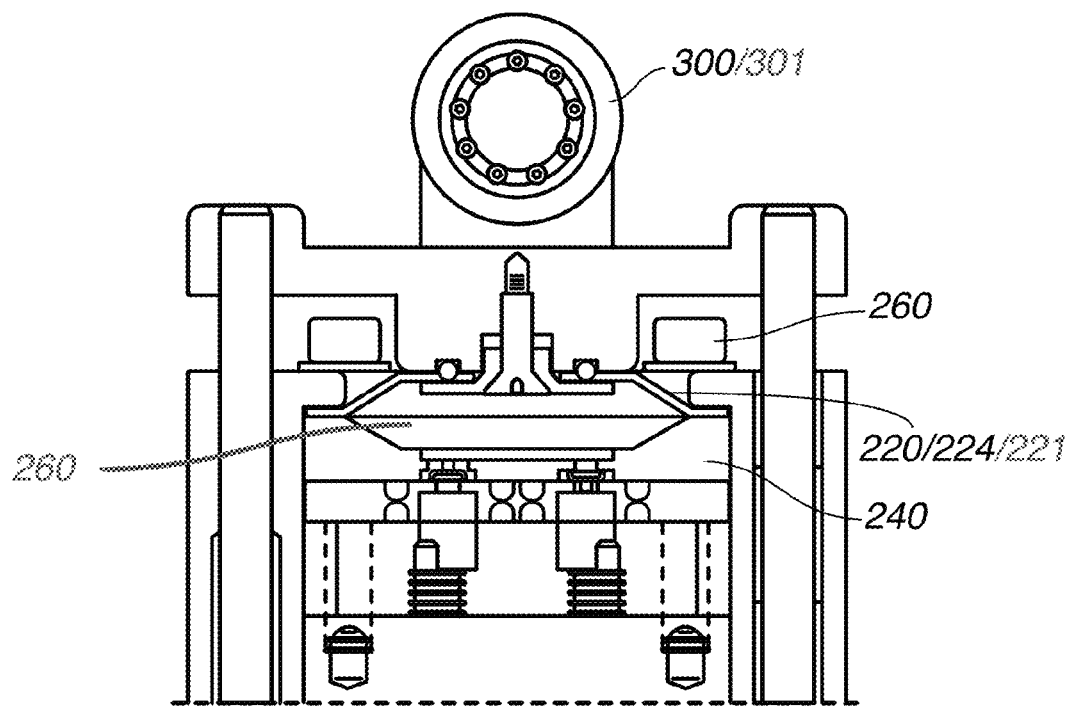

The reciprocating element 220 of the primary pump 200 functions to receive the pumping force from the cam 120 and translate within the lumen, actuating relative to the pump body 240. This actuation preferably creates a variable pressure within the lumen. The reciprocating element 220 is preferably operable between a compressed position 222 and a recovered position 224, as shown in FIGS. 3A and 3B, respectively. In the compressed position 222, a portion of the reciprocating element 220 (e.g., the center) is preferably proximal the pump body bottom. In the recovered position 224, the portion of the reciprocating element 220 is preferably distal the pump body bottom, and is preferably proximal the pump body opening. The reciprocating element 220 preferably travels along a compression stroke to transition from the recovered position 224 to the compressed position 222, and travels along a recovery stroke to transition from the compressed position 222 to the recovered position 224. The reciprocating element 220 can additionally be positioned at a pressurized position, wherein the reciprocating element 220 is located at a second position distal the pump body bottom, wherein the second position is further from the pump body bottom than the recovered position 224. The reciprocating element 220 is preferably at the pressurized position when the force provided by the lumen pressure exceeds the force provided by the cam 120 on the reciprocating element 220.

The reciprocating element 220 preferably translates along an actuation axis within the primary pump 200 throughout the compression stroke, and can additionally translate along the actuation axis throughout the recovery stroke. The reciprocating element 220 preferably includes an actuating area that provides the pressurization force. The actuating area is preferably the surface area of a broad face of the reciprocating element 220, more preferably the surface area of the broad face proximal the lumen but alternatively any other suitable broad face. Alternatively, the actuating area can be the surface area of a section of the reciprocating element 220 that translates between the compressed position 222 and the recovered position 224 (e.g., the center portion).

The reciprocating element 220 preferably forms a fluid impermeable seal with the pump body 240, more preferably with the walls defining the pump body opening, such that the reciprocating element 220 substantially seals the pump body opening. The reciprocating element 220 can be sealed to the pump body 240 by a retention mechanism. The retention mechanism is preferably a clamp that applies a compressive force against the reciprocating element edge and the pump body wall, but can alternatively be screws or bolts through the reciprocating element edge, adhesive between the reciprocating element 220 and the pump body wall or over the reciprocating element 220 and the pump body wall, or any other suitable retention mechanism. The reciprocating element 220 can also be sealed against the pump body wall by melting the interface between the reciprocating element 220 and pump body wall, or by any other suitable means of sealing the reciprocating element 220 against the pump body wall.

The reciprocating element 220 is preferably a flexible diaphragm 221, but can alternatively be a substantially rigid piston, a piston coupled to the diaphragm, or any other suitable element that actuates in response to the pumping force. The diaphragm is preferably a rolling diaphragm (e.g., with a rolled perimeter, wherein the diaphragm is preferably coupled to the pump body 240 with the extra material distal the lumen) but can also be a flat diaphragm, a domed diaphragm (preferably coupled to the pump body 240 with the apex distal the lumen, but alternatively coupled to the pump body 240 with the apex proximal the lumen), or any other suitable diaphragm.

The pump body 240 of the primary pump 200 functions to cooperatively compress a fluid with the reciprocating element 220. The pump body 240 is preferably substantially rigid, but can alternatively be flexible. The pump body 240 is preferably an open pump body with a closed end, wherein the pump body 240 preferably includes a closed end (bottom), walls extending from the closed end, and an opening opposing the closed end. However, the pump body 240 can alternatively have two open ends or any other suitable configuration. The closed end is preferably substantially flat, but can alternatively be curved or have any other suitable geometry. The walls are preferably substantially flat, but can alternatively be curved or have any other suitable geometry. The walls preferably join with the closed end at an angle, more preferably at a right angle, but the transition between the walls and the closed end can alternatively be substantially smooth (e.g., have a bell-shaped or paraboloid longitudinal cross section). The closed end is preferably substantially parallel to the opening defined by the walls, but can alternatively be oriented at an angle relative to the opening. The pump body 240 can be a groove defined in an arcuate or prismatic piece (e.g., in a longitudinal or lateral direction), a cylinder, a prism, or any other suitable shape. The pump body 240 preferably has a substantially symmetrical lateral cross section (e.g., circular, ovular, or rectangular cross section, etc.), but can alternatively have an asymmetrical cross section. The pump body 240 is preferably oriented within the pump system 10 such that the closed end is substantially normal to a radial vector extending from the rotational axis of the drive mechanism 100 (e.g., the normal vector from the closed end is substantially parallel to the radial vector), but can alternatively be oriented with the closed end at an angle to the radial vector. The pump body 240 is preferably oriented with the opening proximal and the closed end distal the rotational axis, particularly when the primary pump 200 rotates about the cam exterior, but can alternatively be oriented with the opening distal and the closed end proximal the rotational axis, particularly when the primary pump 200 rotates about the cam interior, or oriented in any other suitable position relative to the rotational axis.

The primary pump 200 can additionally include a return element 260 that functions to return the reciprocating element 220 to the recovered position 224. The return element 260 preferably provides a recovery force that is less than the compression force provided by the third section 128 of the cam 120, but larger than the force applied by the cam 120 in the second section 126. The recovery force is preferably provided in a direction substantially parallel to a radial vector extending from the rotational axis of the drive mechanism 100, but can alternatively be provided in any suitable direction. The return element 260 is preferably located on the pump body 240 side of the reciprocating element 220 (distal the cam 120 across the reciprocating element 220), wherein the return element 260 preferably pushes the reciprocating element 220 from the compressed position 222, through the recovery stroke, and to the recovered position 224. Alternatively, the return element 260 can be located on the cam side of the reciprocating element (distal the pump body 240 across the reciprocating element 220), wherein the return element 260 pulls the reciprocating element 220 back to the recovered position 224 from the compressed position 222. The return element 260 is preferably coupled to the perimeter of the reciprocating element 220 or to a component (e.g., a brace) coupled to the reciprocating element 220 and extending past the pump body walls, but can alternatively be coupled to the body of the reciprocating element 220 (e.g., to the section actuating between the compressed position 222 and the recovered position 224). The return element 260 is preferably coupled to the reciprocating element 220 external the pump body 240, but can alternatively be coupled to the reciprocating element 220 within the pump body 240. The return element 260 is preferably a spring, but can also include the intrinsic properties of the actuation element (e.g., the elasticity of the diaphragm) or any other suitable return element 260.

The primary pump 200 preferably additionally includes one or more inlets that facilitate fluid ingress into the lumen from the first reservoir 400 and one or more outlets that facilitate fluid egress from the lumen to the second reservoir 500. Alternatively, the primary pump 200 can include one fluid manifold that functions as both the inlet and outlet, wherein said fluid manifold is fluidly connected to and selectively permits fluid flow from the first and second reservoirs. The inlet and outlet are preferably defined through the walls of the pump body 240, but can alternatively be defined through the reciprocating element 220, through the junction between the pump body 240 and the reciprocating element 220, or defined in any other suitable portion of the primary pump 200. The inlet and outlet are preferably located on opposing walls, but can alternatively be adjacent on the same wall, be located on the closed end, or be located in any other suitable position.

The inlet and outlet of the pump 200 preferably include inlet and outlet valves that control fluid flow through the respective fluid channels. The valves are preferably passive valves, but can alternatively be active valves controlled by a controller based on system measurements made by sensors. The valves are preferably one-way valves, but can alternatively be two-way valves, or any other suitable valve. The valves are preferably each operable in an open mode and a closed mode, and preferably have a low threshold pressure at which the valve switches from the closed mode to the open mode. The inlet valve located within the inlet is preferably configured to control fluid ingress into the primary pump 200, and prevents fluid egress out of the primary pump 200. The inlet valve is preferably in the open mode to permit fluid ingress when the lumen pressure is lower than or equal to the pressure within the first reservoir 400. Alternatively, the inlet valve can be in the open mode when the lumen pressure is negative. The inlet valve is preferably in the closed mode when the lumen pressure is higher than or equal to the pressure within the first reservoir 400. The outlet valve located within the outlet is preferably configured to control fluid egress from the primary pump 200, and prevents fluid ingress into the primary pump 200. The outlet valve is preferably in the open mode to permit fluid egress when the lumen pressure exceeds the pressure within the second reservoir 500 and the outlet valve threshold pressure. The outlet valve is preferably in the closed mode when the lumen pressure is lower than or equal to the pressure within the second reservoir 500.

The force translator 300 of the pump system 10 functions to actuate the reciprocating element 220 through the compression stroke as the primary pump 200 rotates about the rotational axis, and can additionally function to translate the reciprocating element 220 through the recovery stroke. The force translator 300 preferably includes an axis having an arcuate position that is fixed relative to an arcuate position of the primary pump 200 (the angular position of the force translator 300 axis about the rotational axis is preferably fixed relative to the angular position of the primary pump 200). More preferably, the force translator 300 or a portion thereof has an angular position fixed to and substantially similar to the angular position of the primary pump 200 about the rotational axis, such that the force translator 300 travels with the primary pump 200 about the rotational axis.

In a first variation of the force translator 300, the force translator 300 travels along the arcuate bearing surface 122 of the cam 120. The force translator 300 preferably maintains a substantially constant distance between the arcuate bearing surface 122 and the reciprocating element 220, such that the force translator 300 applies a variable force against the reciprocating element 220 as the force translator 300 travels along the variable curvature of the arcuate bearing surface 122 of the cam 120. The force translator 300 is preferably substantially rigid, and preferably has substantially fixed dimensions (e.g., diameter) that remain substantially constant throughout force translator motion relative to the cam 120. The force translator 300 is preferably a roller 301 or bearing, wherein the axis that is fixed to the primary pump angular position is preferably the rotational axis of the roller. The force translator 300 is preferably in non-slip contact with the arcuate bearing surface 122, but can alternatively slide along the arcuate bearing surface 122. The force translator 300 is preferably rotatably coupled to the reciprocating element 220, but can alternatively be otherwise coupled to the reciprocating element 220. When the reciprocating element 220 is a piston, the reciprocating element 220 preferably rotatably connects to the roller at the rotational axis of the roller, but can connect to the roller with a semi-circular cup that cups the roller, or through any other suitable coupling mechanism. When the reciprocating element 220 is a diaphragm, the reciprocating element 220 can directly contact the diaphragm, couple to the diaphragm through a piston, or couple to the diaphragm in any other suitable manner.

In another variation of the force translator 300, the force translator 300 is rotatably coupled to the cam 120 at a fixed position on the cam 120 and rotatably coupled to a fixed position on the reciprocating element 220. The force translator 300 is preferably rotatably coupled to the reciprocating element 220 (e.g., at a piston), but can alternatively be slidably coupled to the reciprocating element 220 or otherwise coupled to the reciprocating element 220. In this variation, the force translator 300 preferably translates the varying distance between the respective fixed ends into the variable occluding force. The force translator 300 is preferably a linkage with two or more links, but can alternatively be any suitable force translator 300.

However, the force translator 300 can alternatively be any suitable mechanism that translates cam rotation relative to the primary pump 200 into a variable occluding force against the reciprocating element 220.

Figure 7A:
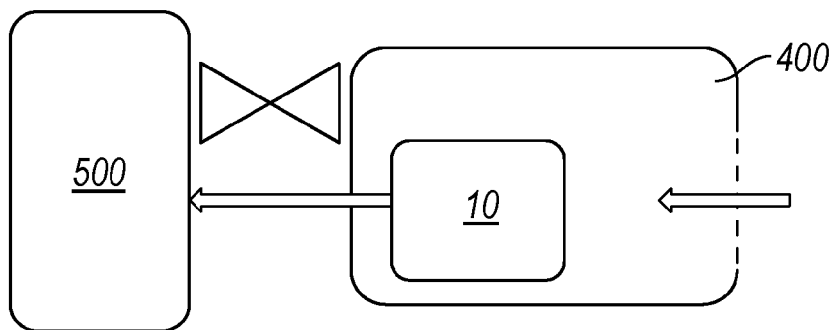
FIGS. 7A and 7B are schematic representations of a variation of the pump system wherein the first reservoir pressure is equal to or below the ambient pressure and wherein the first reservoir pressure is higher than the ambient pressure, respectively.
Figure 7B:
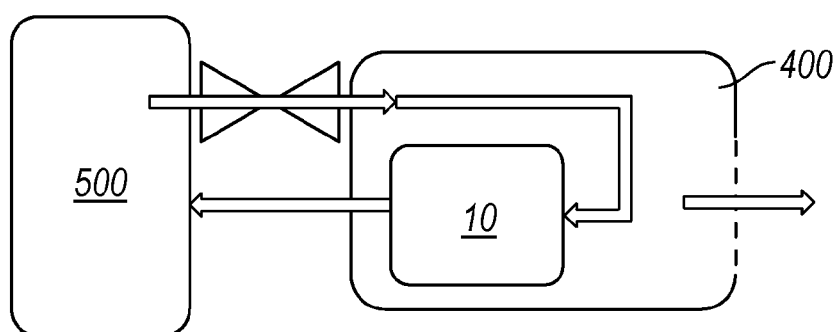

The pump system 10 preferably additionally includes a housing that functions to couple the pump system components to the rotating surface 20. The housing is preferably configured to removably statically couple to the rotating surface 20, but can otherwise couple to the rotating surface 20. More preferably, the housing is configured to mount (e.g., bolt, screw, etc.) to the hub of a tire, but can alternatively mount to the rim, axle, or any other suitable component of a tire. The housing is preferably rotatably coupled to the drive mechanism 100 and is preferably statically coupled to the pump body 240 of the primary pump 200, such that the primary pump 200 rotates with the housing. The housing can additionally function to mechanically protect the pump system components, wherein the housing preferably substantially encloses the pump system components. The housing is preferably substantially rigid, but can alternatively be substantially flexible. The housing is preferably substantially fluid impermeable, but can alternatively be permeable to fluid. In one variation of the pump system 10, the housing functions as the first reservoir 400, wherein the primary pump 200 inlet is fluidly connected to and draws fluid from the housing interior. In this variation, the housing can include an inlet manifold fluidly connecting the housing interior with the ambient environment. As shown in FIGS. 7A and 7B, the inlet manifold preferably includes a water-selective membrane that preferentially permits gas flow therethrough (e.g., the gas flow rate through the water-selective membrane is higher than the water flow rate through the water-selective membrane). The water-selective membrane is preferably a GORE™ membrane, but can alternatively be any other suitable membrane. The inlet manifold can alternatively include an inlet valve that controls fluid flow into the housing interior, but can alternatively not include any valves. The inlet valve is preferably a passive one-way valve operable between an open mode in response to the housing interior pressure falling below or being equal to the ambient pressure and a closed mode in response to the housing interior pressure exceeding the ambient pressure. However, the inlet valve can be an active valve, a two-way valve, or any other suitable valve.

2. Relief Valve

The pump system 10 can additionally include a relief valve 700 which functions to leak air from the interior of the second reservoir 500 (e.g. tire interior) of the into the pump system 10, more preferably into the housing of the pump system 10 (e.g. the first reservoir 400), but can alternatively leak air from the second reservoir 500 to the ambient environment. Leaking air through the relief valve 700 can confer several benefits. First, leaking air through the relief valve 700 can prevent overpressurization of the second reservoir 500. Second, leaking air through the relief valve 700 can allow the pump system 10 directly measure the internal pressure of the second reservoir 500. Third, leaking air through the relief valve 700 into the housing (first reservoir 400) effectively recycles the already-pumped air, reducing the amount of air treatment (e.g. desiccation) required. The relief valve 700 preferably connects to the second reservoir interior through the Schraeder valve of the second reservoir 500, but can otherwise fluidly connect to the second reservoir 500. The relief valve 700 preferably operates between an open mode wherein air flow through the relief valve 700 is permitted, and a closed mode wherein air flow through the relief valve is prevented. The relief valve preferably includes an open threshold pressure, and is preferably a fail closed relief valve. The shutoff threshold is preferably set to leak second reservoir pressure at a rate substantially close to the flow rate of the pump (e.g. 10 cubic inches/minute), but can alternatively leak at a rate substantially close to the normal second reservoir leakage rate (e.g., 1-3 psi per month), but can alternatively leak second reservoir pressure at a higher or lower rate. The relief valve 700 is preferably a normally-closed relief valve, but can alternatively be a normally-open relief valve that is held closed, or any other suitable valve. The relief valve 700 is preferably passive, but can alternatively be active. The relief valve 700 is preferably a check relief valve, but can alternatively be any other suitable relief valve 700. Examples of relief valves that can be used include a duckbill relief valve, a pilot-operated relief valve, a ball relief valve, a poppet relief valve, and a diaphragm relief valve. Alternatively, any other suitable relief valve can be used.

A measurement element functions to monitor an operational parameter and display a measurement indicative of internal second reservoir pressure. The measurement element is preferably located within the body of the pump system 10, but can be partially or wholly external the pump system 10. The measurement element is preferably fluidly coupled to the relief valve 700, and preferably measures a parameter of the fluid that flows through the relief valve 700. The measurement element is preferably passive, but in alternative embodiments the measurement element can be active.

The measurement element preferably includes a sensor and a display. The sensor preferably measures the operational parameter, and can be a pressure sensor, a flow rate sensor, a temperature sensor, or any other suitable sensor. The sensor can be mechanical or digital (e.g., generate a voltage/current, be powered, or leverage a voltage/current for measurements). The display is preferably passive, and can be a dial indicator, a ruler, or any other suitable gauge. However, the display can be active (e.g., powered, such as a digital display), wherein the displayed value can be calculated by a controller.

In a first variation, the measurement element includes a measurement reservoir and a pressure gauge. The reservoir is fluidly coupled to the relief valve 700, such that air leaks from the second reservoir interior into the measurement reservoir when the valve opens. The measurement reservoir is preferably substantially small, such that the measurement reservoir pressure equilibrates with the second reservoir pressure even with the low air leakage rate permitted by the relief valve. However, the measurement reservoir can alternatively be any suitable size. The measurement reservoir is preferably a plenum, but can alternatively be a tube, channel, or any other suitable reservoir. The pressure gauge is preferably coupled to the reservoir and measures the pressure of the reservoir interior. The pressure measured is preferably the gauge pressure, but may alternatively be the differential pressure (e.g., between the reservoir interior and the second reservoir inflation system exterior/ambient) or the absolute pressure. The display portion of the pressure gauge is preferably located on the external surface of the pump system 10, more preferably parallel to the face of the wheel to which the pump system 10 is mounted.

In a second variation, the measurement element includes a mass air flow meter coupled to a display. The flow meter preferably measures and fluidly couples to the inflator side of the relief valve (e.g., downstream from the relief valve), but can alternatively measure the flow into the relief valve (e.g., second reservoir 500 side flow) or flow through the relief valve body, wherein a portion of the flow meter is located within the relief valve. In this variation, the downstream side of the relief valve is preferably held at an approximately known pressure that is substantially higher than ambient, but slightly lower than the expected second reservoir pressure. For example, the relief valve can be coupled to a downstream reservoir that includes a relief valve with a threshold opening pressure slightly lower than the expected second reservoir pressure, such that the downstream pressure will always be approximately the threshold opening pressure. In another example embodiment, the relief valve can be coupled to the second reservoir inflator reservoir holding the air to be pumped into the second reservoir 500. The flow meter preferably produces a voltage or current indicative of the air flow rate, wherein the voltage/current is fed into a controller, converted into a pressure measurement by the controller, and displayed as a pressure readout. Alternatively, the flow meter can be passive and measure the flow rate mechanically, wherein the position of a gauge or indicator is converted into a pressure readout. The air flow meter can be a vane meter sensor, a hot wire sensor, a coldwire sensor, a Karman vortex sensor, a membrane sensor, a laminar flow element, a turbine flow meter, a rotary piston, or any other suitable flow meter. The display is preferably a digital display, but can alternatively be an analog display.

However, any other suitable relief valve can be included in the pump system 10 to facilitate second reservoir pressure regulation.

3. Torque Stabilization Mechanism

The pump system 10 can additionally include a torque stabilization mechanism 600 that compensates for the back force applied by the primary pump 200 to the cam 120 at the beginning of the recovery stroke. Compensation of the back force can be desirable as the back force can provide a radial force on the cam 120, which in turn can be transmitted to the eccentric mass 140, thereby disrupting the system. The torque stabilization mechanism 600 is preferably located on the cam 120, but can alternatively be located on the force translator 300 (e.g., have an adjustable dimension that changes in response to the applied force), on the primary pump 200, or on any other suitable pump system component.

In one variation of the pump system 10, the cam profile functions as the torque stabilization mechanism 600, wherein the low curvature of the second segment accommodates for the back force.

Figure 8A:
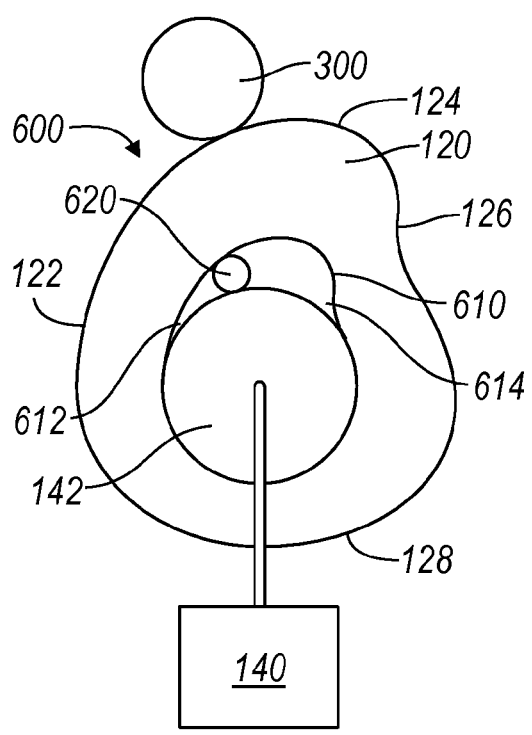
FIGS. 8A and 8B are schematic representations of a variation of the torque stabilization mechanism in the pumping and non-pumping mode, respectively.
Figure 8B:
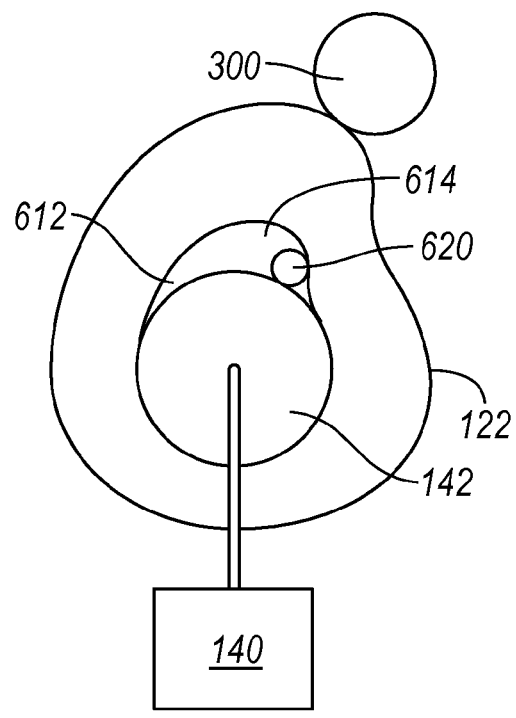

In another variation of the pump system 10, the mass couple 142 functions as the torque stabilization mechanism 600, wherein the mass couple 142 is operable in the coupled mode during the compression stroke (through the third section 128 up to the apex of the second section 126) and operable in the decoupled mode during the recovery stroke. In one example, as shown in FIGS. 8A and 8B, the torque stabilization mechanism 600 includes a profiled channel 610 defined between the interior bearing surface of the cam and the mass couple 142 (e.g., wherein the mass couple 142 is a disk) by the interior bearing surface. The profiled channel 610 preferably includes a low clearance section 612 extending to a high clearance section 614, wherein the clearance is the distance between the mass couple surface and the interior bearing surface. The apex of the high clearance section is preferably substantially radially aligned with the first section 124, more preferably with the apex of the first section 124, but can alternatively be aligned with the beginning of the second section 126, slightly before the apex of the first section 124, or aligned with any other suitable portion of the cam 120. The beginning of the low clearance section is preferably radially aligned within the arc defined by the third section 128, but can alternatively be aligned with any suitable portion of the cam 120. The torque stabilization mechanism 600 preferably additionally includes a mobile element 620 located within the profiled channel 610 that couples and decouples the mass couple 142 with the interior bearing surface. The mobile element preferably couples the mass couple 142 with the interior bearing surface with friction, but can alternatively be a ratcheting mechanism or any other suitable mechanism. The mobile element preferably has a dimension substantially equivalent to the distance between mass couple surface and the interior bearing surface at the low clearance section. The mobile element is preferably wedged in the low clearance section when the eccentric mass 140 is in the coupled mode, wherein the mobile element retains the position of the mass couple 142 relative to the interior bearing surface. The mobile element is preferably located in the high clearance section when the eccentric mass 140 is in the decoupled mode, wherein the mobile element is substantially free from the mass surface and/or interior bearing surface and permits relative motion between the mass couple 142 and the interior bearing surface. The mobile element is preferably a roller, but can alternatively be a cylinder or any other suitable mobile element. In operation, as the primary pump 200 reaches the apex of the first section 124 (compressed position 222), the reciprocating element 220 exerts a radial back force on the force translator 300, pushing the cam 120 radially away from the primary pump 200. Furthermore, as this point is reached, the angular speed of the cam 120 relative to the primary pump 200 slows down. This radial motion, coupled with the slower angular cam speed, frees the mobile element from the low clearance section (wherein the mobile element is still travelling at the faster angular speed), and causes the mobile element to travel with the high clearance section as the primary pump 200 travels over the second section 126 of the arcuate surface, as shown in FIG. 8B. The angular cam speed preferably increases as the primary pump 200 travels over the second section 126, but can alternatively stay substantially constant or slow down. At the end of the second section 126, the angular cam speed is preferably decreased due to the increased contact force between the cam 120, force translator 300, and primary pump 200. This decreased angular speed preferably causes the mobile element to wedge into the low clearance section, as shown in FIG. 8A.

Figure 9A:
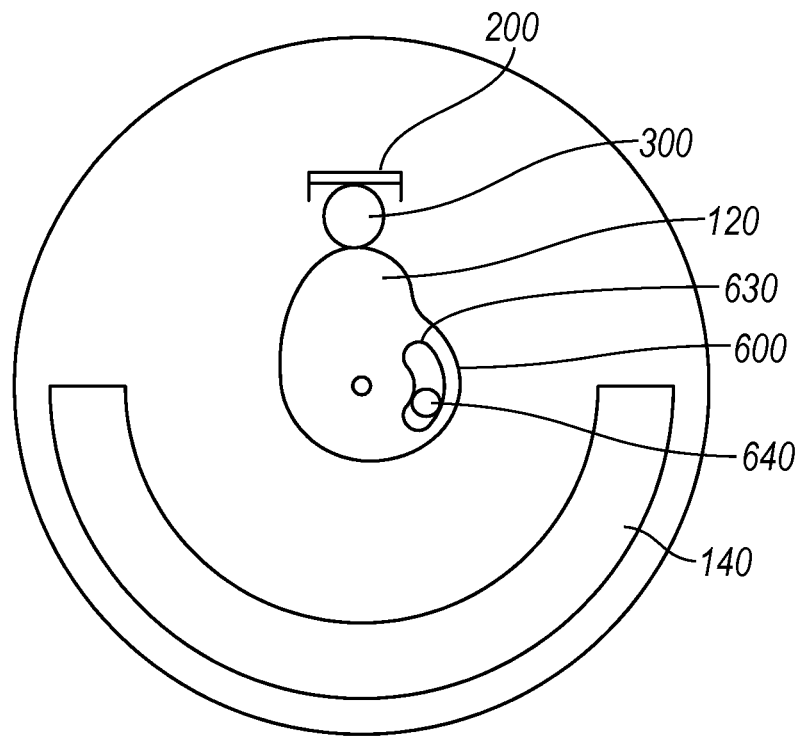
FIGS. 9A and 9B are schematic representations of a second variation of the torque stabilization mechanism in the pumping and non-pumping mode, respectively.
Figure 9B:
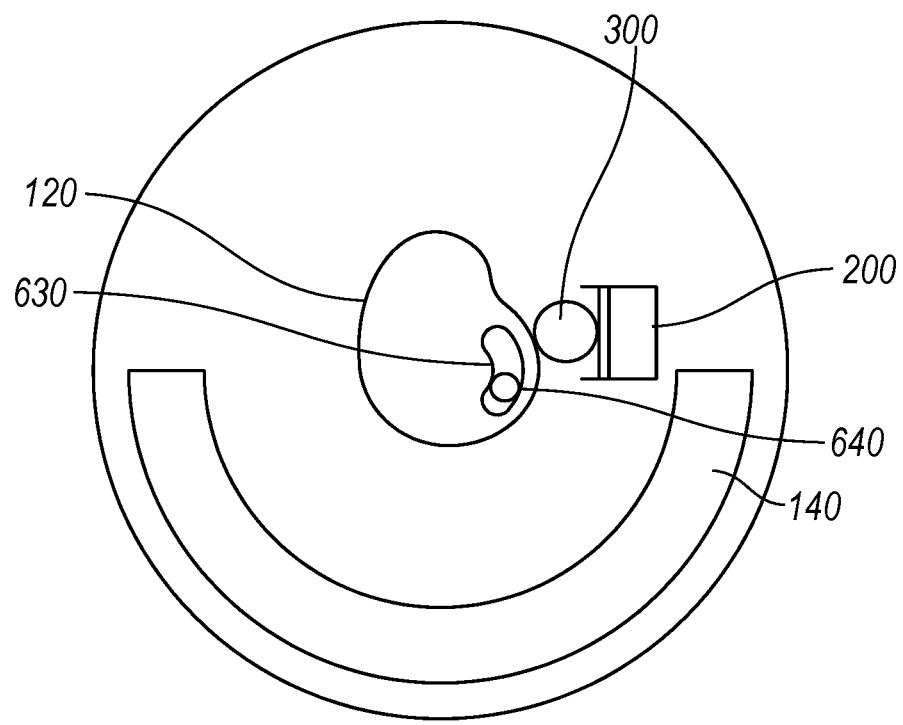

In another variation, the torque stabilization mechanism 600 includes a groove 630 defined within the cam 120 and a pin 640 extending from the mass couple 142 into the groove. The groove preferably functions to accommodate for the radial back force by turning the linear back force into a rapid rotation of the cam 120 (relative to the primary pump 200) through the first section 124. The pin is preferably operable between a coupled position (shown in FIG. 9A) and a decoupled position (shown in FIG. 9B) within the groove. The groove is preferably defined through the cam body in a normal direction to the cam broad face, but can alternatively be defined any suitable portion of the cam body. The groove is preferably aligned with the second section 126 of the arcuate bearing surface 122, but can be defined in any other suitable portion of the cam 120. The groove preferably traces an arc, but can alternatively be substantially linear, serpentine, or have any other suitable shape. In operation, the back pressure applied by the primary pump 200 on the cam 120 forces the pin from the coupled position to the decoupled position, effectively rotating the cam 120 relative to the eccentric mass 140. When the primary pump 200 reaches the end of the second section 126, the force applied by the cam 120 on the primary pump 200 preferably transitions the pin back to the coupled position.

However, any other suitable torque stabilization mechanism 600 that accommodates for the radial force applied by the pressurized primary pump 200 on the cam 120 can be used.

4. Passive Pressure Regulation Mechanism

Figure 15A:
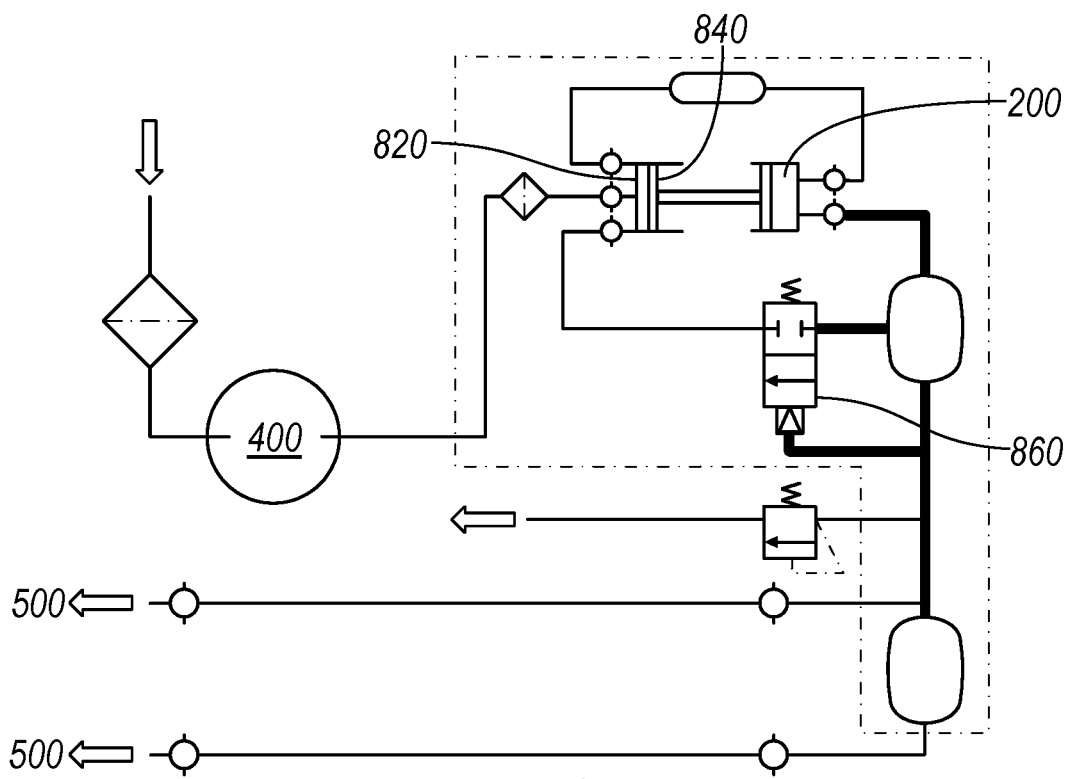
FIGS. 15A and 15B are schematic flow diagrams of a variation of the pressure regulation mechanism in the pumping and non-pumping modes, respectively.
Figure 15B:
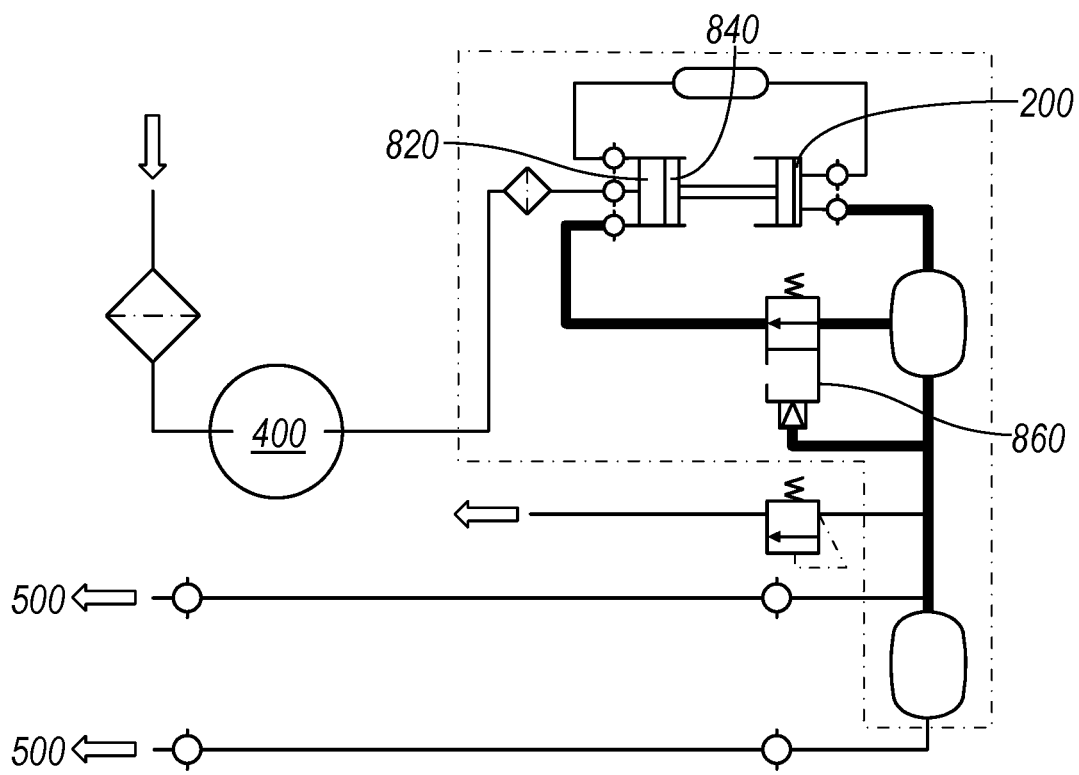

The pump system 10 can additionally include a passive pressure regulation mechanism 800 that preferably functions to passively cease pressurization of the reservoir when a threshold reservoir pressure is reached. This is preferably accomplished by passively ceasing primary pump pumping. The passive pressure regulation mechanism 800 preferably ceases pumping by ceasing force application to the reciprocating element 220, wherein force application can be ceased by decoupling the force translator 300 from the cam 120, decoupling the primary pump 200 from the cam 120, decoupling the force translator 300 from the primary pump 200, or eliminating the relative motion between the primary pump 200 and the cam 120, an example of which is shown in FIGS. 15A and 15B. The passive pressure regulation mechanism 800 of the pump system 10 preferably includes a secondary pump 820 including pump body 240 and an actuating mechanism 840, and additionally includes a regulation valve 860 having an opening and a closing threshold pressure. Alternatively, the passive pressure regulation mechanism 800 can include a regulation valve 860 and the primary pump 200. The passive pressure regulation mechanism 800 is preferably fluidly connected to the second reservoir 500, wherein the regulation valve 860 selectively controls fluid flow into the secondary pump 820 based on the pressure of the second reservoir 500.

The secondary pump 820 is preferably a reciprocating pump substantially similar to that described above, wherein the actuating mechanism 840 is the reciprocating element. The secondary pump 820 is more preferably a piston pump but can alternatively be a diaphragm pump. The secondary pump 820 can alternatively be any other suitable positive displacement pump. The pressure regulation mechanism 800 is preferably operable in a pressurized mode and a depressurized mode. The pressurized mode is preferably achieved when the reservoir pressure exceeds the threshold pressure. More preferably, the pressurized mode is achieved when the reservoir pressure exceeds the opening threshold pressure of the valve 860. In the pressurized mode, the valve 860 is preferably in an open position and permits fluid flow from the reservoir into the pump body 240, wherein the pressure of the ingressed fluid places the actuating mechanism 840 in the pressurized position. In the pressurized position, the actuating mechanism 840 preferably actuates or couples against the drive mechanism 100, force translator 300, or primary pump 200 to cease pumping force application to the primary pump 200. In the depressurized mode, the valve 860 is preferably in a closed position and prevents fluid flow from the reservoir into the pump body 240, wherein a return mechanism places the actuating mechanism 840 in a depressurized position, wherein the depressurized position is preferably the recovered position 224 but can alternatively be the compressed position 222 or any other suitable position therebetween. The pump system 10 preferably includes at least one pressure regulation mechanism 800, but can alternatively include any suitable number of pressure regulation mechanisms.

The position of the pressure regulation mechanism 800, more preferably the position of the pump body 240, is preferably statically coupled to the primary pump position, but can alternatively be moveably connected to the primary pump 200 position. The angular position of the pressure regulation mechanism 800 is preferably maintained relative to the primary pump position, but the radial or linear distance can alternatively be maintained. The actuation axis of the pressure regulation mechanism 800 is preferably in the same plane as the actuation axis of the primary pump 200, but can alternatively be in different planes, perpendicular to the actuation axis of the primary pump 200, or arranged in any other suitable manner. The pressure regulation mechanism 800 is preferably arranged relative to the primary pump 200 such that the direction of the compression stroke of the pressure regulation mechanism 800 differs from the direction of the compression stroke of the primary pump 200. The direction of the compression stroke of the pressure regulation mechanism 800 directly opposes the direction of the compression stroke of the primary pump 200 (e.g., the closed end of the pump cavity is distal the closed end of the pump body 240, and the actuating element is proximal the reciprocating element 220, wherein the actuation axes are aligned or in parallel), but can alternatively be at an angle to the direction of the compression stroke of the primary pump 200. Alternatively, the pressure regulation mechanism 800 can be arranged such that the compression stroke of the pressure regulation mechanism 800 and the compression stroke of the pressure regulation mechanism 800 have substantially the same direction (e.g., the actuation axes are aligned or in parallel).

Figure 12A:
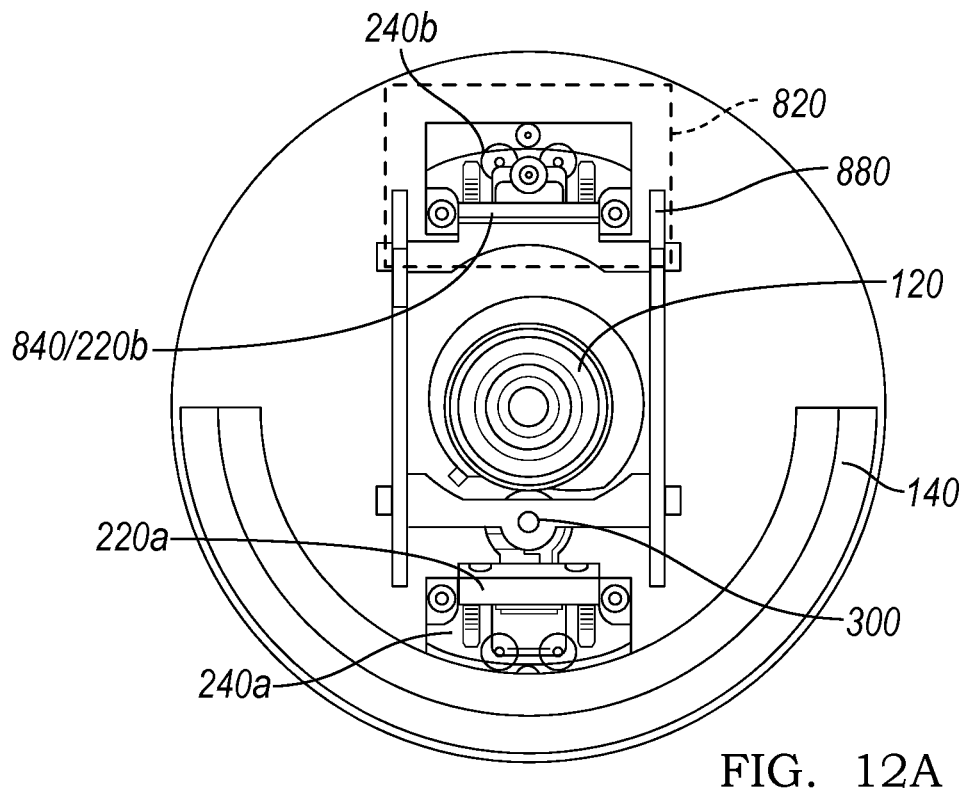
FIGS. 12A and 12B are sectional views of a variation of the pressure regulation mechanism in the pumping and non-pumping modes, respectively.
Figure 12B:
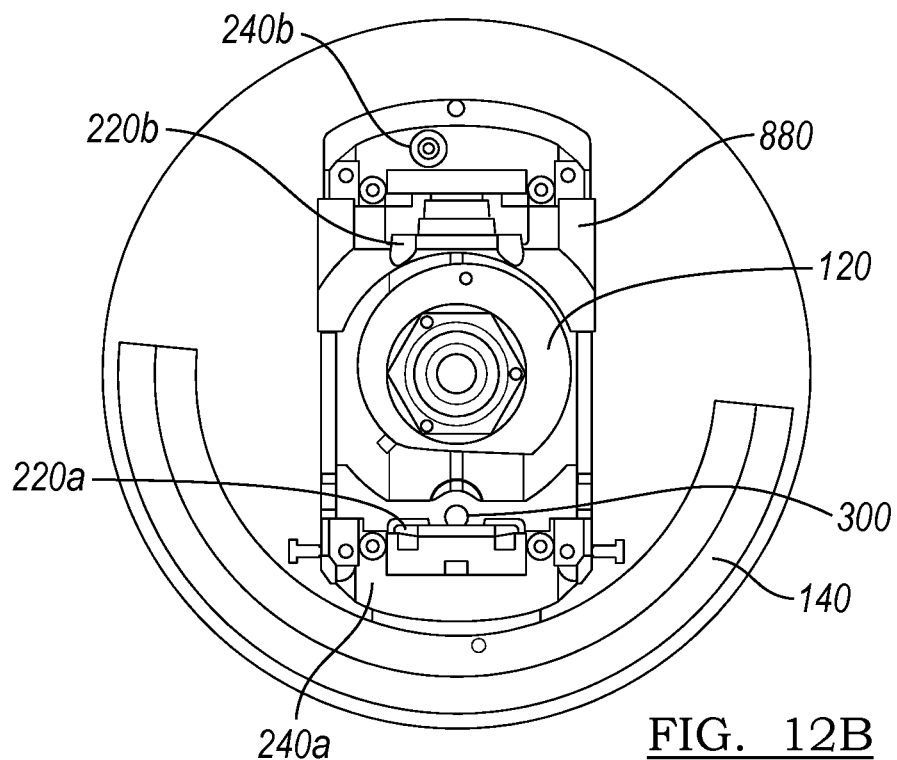

In one variation of the pressure regulation mechanism 800, the actuating mechanism 840 decouples the primary pump 200 or a primary pump component from drive mechanism 100 when in the pressurized position, and permits the primary pump 200 to couple with the drive mechanism 100 when in the depressurized position (as shown in FIGS. 12A and 12B). The actuating mechanism 840 preferably decouples the force translator 300 from the drive mechanism 100, but alternatively decouples the reciprocating element 220 or the entirety of the primary pump 200 from the drive mechanism 100. The actuating mechanism 840 preferably moves the primary pump component along the actuation axis of the primary pump 200, away from the cam 120, when transitioning from the depressurized position to the pressurized position. However, the actuating mechanism 840 can move the primary pump component at an angle to the actuation axis of the primary pump 200, away from the cam 120 (e.g., in a perpendicular direction). The actuating mechanism 840 preferably translates the primary pump component within the plane encompassing the actuation axis or the pump body 240, but can alternatively translate the primary pump component out of said plane. The force exerted on the actuating mechanism 840 by the return element 260 of the secondary pump 820 preferably couples the primary pump component with the drive mechanism 100 while returning the actuating mechanism 840 to the depressurized position, but the pump system 10 can alternatively include a second return element 260 that couples the primary pump component to the drive mechanism 100 (e.g., a spring biased such that the spring opposes the direction that the actuating mechanism 840 moves the primary pump component, etc.). The second return element 260 preferably returns the primary pump component contact with the drive mechanism 100 when the decoupling force of the actuating mechanism falls below the return force provided by the second return element.

A portion of the actuating mechanism 840 is preferably statically coupled to a portion of the primary pump 200, wherein actuating mechanism actuation results in a positional change of the primary pump 200 or a primary pump component. More preferably, actuating mechanism actuation preferably selectively couples and decouples the primary pump 200 from the drive mechanism 100 when the actuating mechanism 840 is in the depressurized and pressurized positions, respectively. The actuating mechanism 840 is statically coupled to the force translator 300, but can alternatively be statically coupled to the reciprocating element 220, statically coupled to the primary pump 200 as a whole, or statically coupled to any other suitable primary pump component. The actuating mechanism 840 is preferably statically coupled to the primary pump component by a frame 880, but can alternatively be coupled by the housing encapsulating the pump system 10 or by any other suitable coupling mechanism. The frame 880 can be aligned within the plane encompassing the actuation axis of the primary pump 200, within the plane encompassing the actuation axis of the pressure regulation mechanism 800, extend out of either of said two planes, or be otherwise oriented relative to the pump system 10. In a specific example, the force translator 300 is a roller, wherein the actuating mechanism 840 is coupled to the rotational axis of the roller by a frame 880 aligned with a plane encompassing both the actuation axis of the pressure regulation mechanism 800 and the actuation axis of the primary pump 200, wherein the pressure regulation mechanism 800 and primary pump 200 preferably share a common plane. Alternatively, the actuating mechanism 840 transiently couples to the primary pump component when in the pressurized position, and is retracted away from the primary pump component when in the depressurized position.

In another variation of the pressure regulation mechanism 800, the actuating mechanism 840 decouples the force translator 300 from primary pump 200 in the pressurized position, and permits force translator 300 coupling with the primary pump 200 when in the depressurized position. The actuating mechanism 840 preferably connects to and moves the force translator linear position relative to the drive mechanism 100 when in the pressurized position, but can alternatively connect to and move the primary pump linear position relative to the force translator 300 and drive mechanism 100. The actuating mechanism 840 preferably moves the force translator 300 out of the common plane shared by the primary pump 200 and the drive mechanism 100, but can alternatively move the force translator 300 out of line with the actuation axis (e.g., perpendicular, within the common plane). The actuating mechanism 840 can be statically coupled to the force translator 300 or primary pump 200 by a frame 880, a weld, adhesive, or any other suitable coupling mechanism. Alternatively, the actuating mechanism 840 can be transiently coupled to the force translator 300 or primary pump 200, wherein the actuating mechanism 840 can be a piston or rod that transiently couples to the force translator 300 or primary pump 200 through a coupling feature (e.g., a groove) or friction.

Figure 13A:
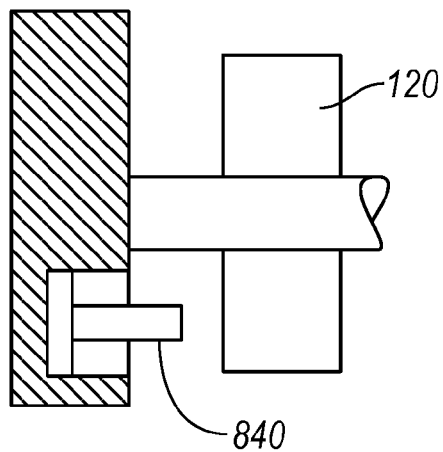
FIGS. 13A and 13B are sectional views of a second variation of the pressure regulation mechanism in the pumping and non-pumping modes, respectively.
Figure 13B:
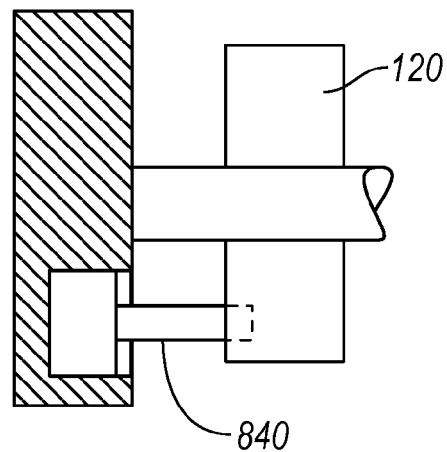
Figure 14A:
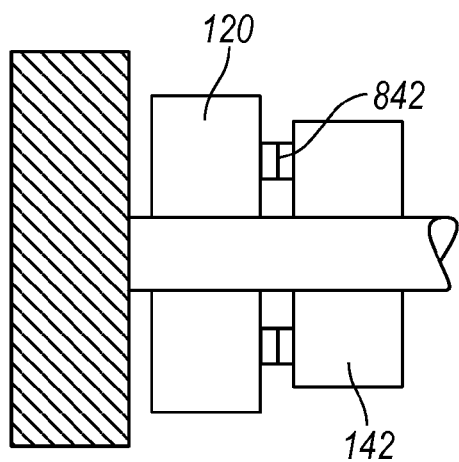
FIGS. 14A and 14B are sectional views of a third variation of the pressure regulation mechanism in the pumping and non-pumping modes, respectively.
Figure 14B:
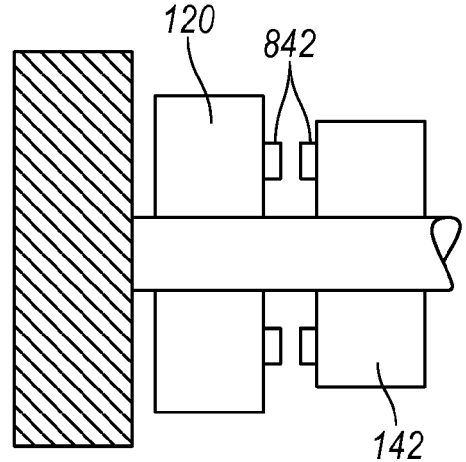

In another variation of the pressure regulation mechanism 800, the actuating mechanism 840 ceases force generation. In one alternative, the pressure regulation mechanism 800 statically couples the angular position of the drive mechanism 100 to the primary pump 200, ceasing force generation by eliminating the relative motion between the drive mechanism 100 and the primary pump 200 (as shown in FIGS. 13A and 13B). For example, the actuating mechanism 840 can statically couple the angular position of the cam 120 with the angular position of the primary pump 200 in the pressurized position, and decouple the angular position of the cam 120 from the angular position of the primary pump 200 in the depressurized position. In a specific example, the actuating mechanism 840 is a rod that couples to the cam broad face by friction. In another specific example, the actuating mechanism 840 is a rod that extends into a groove in the cam broad face (e.g., the broad face proximal the housing or distal the housing) when in the pressurized position, and is retracted from the groove when in the depressurized position. In another specific example, the actuating mechanism 840 statically couples to the arcuate bearing surface 122 of the cam 120. However, other mechanisms of transiently retaining the cam angular position can be used. In another example, the actuating mechanism 840 can statically couple the angular position of the eccentric mass 140 with the angular position of the primary pump 200. In a specific example, the actuating mechanism 840 can include a rod that couples to the broad face of the eccentric mass 140 or to the mass couple 142 by friction. In another specific example, the actuating mechanism 840 is a rod that extends into a groove in the eccentric mass face when in the pressurized position and is retracted from the groove when in the depressurized position. However, other mechanisms of transiently retaining the eccentric mass angular position can be envisioned. In another example, the pump body 240 of the primary pump 200 can be statically coupled to the drive mechanism 100, such that relative motion between the reciprocating element 220 and the pump body 240 is ceased (e.g., when a linear or rotary actuator is used). In another alternative, the pressure regulation mechanism 800 decouples the force generator from the drive interface of the drive mechanism 100. For example, when the cam 120 and eccentric mass 140 are transiently coupled by a transient coupling mechanism, the actuating mechanism 840 can actuate the cam 120, eccentric mass 140, or coupling mechanism to decouple the cam 120 from the eccentric mass 140. In one specific example as shown in FIGS. 14A and 14B, the cam 120 is coupled to the eccentric mass 140 along the respective broad faces by a ring of magnets 842 encircling the rotational axis, and the actuating mechanism 840 extends through a hole in the cam 120 (or eccentric mass 140) and pushes against the broad face of the eccentric mass 140 (or cam 120) to decouple the eccentric mass 140 from the cam 120. The actuating mechanism 840 can be statically coupled to the force translator 300 or primary pump 200 by a frame 880 or other coupling mechanism. Alternatively, the actuating mechanism 840 can be transiently coupled to the force translator 300 or primary pump 200, wherein the actuating mechanism 840 can be a piston or rod that couples to the force translator 300 or primary pump 200.

In another variation of the pressure regulation mechanism, the pressure regulation mechanism 800 switches the primary pump 200 from the pumping mode and a locked mode. The primary pump 200 preferably pumps fluid in the pumping mode and does not pump fluid in the locked mode. More preferably, components of the pump system 10 are held in static relation relative to each other in the locked mode, such that the reciprocating element 220 is held substantially static. The primary pump 200 is preferably placed in the locked mode when the pressure of the second reservoir 500 exceeds the opening threshold pressure of the valve 860, and is preferably placed in the pumping mode when the pressure of the second reservoir 500 falls below the closing threshold pressure of the valve 860. More specifically, when the pressure of the second reservoir 500 exceeds the opening threshold pressure, the valve 860 opens, allowing pressurized air to flow from the second reservoir 500 into the compression volume of the primary pump 200, substantially retaining the reciprocating element 220 in the initial position of the compression stroke (e.g., in the recovered position). In this manner, the increased force of pressurized air on the reciprocating element 220 substantially opposes cam motion when the reciprocating element 220 is located at the second section 126 of the cam profile, but can alternatively or additionally oppose cam motion when the reciprocating element 220 is located at the first section 124 or third section 128 of the cam profile. Since the cam 120 is preferably configured to only apply a small force to the reciprocating element 220 at the second section 126, the cam 120 cannot overcome the large back force applied by the backflow on the reciprocating element 220. These aspects of the pump system 10 effectively cease pumping within the primary pump 200. The force applied by the backflow prevents cam movement relative to the primary pump 200, causing the cam 120 and subsequently, the eccentric mass 140, to rotate with the pump system 10. When the pump system 10 includes multiple pumps, all the pumps are preferably flooded with pressurized air. Alternatively, a single pump can be flooded with pressurized air, alternating pumps can be flooded with pressurized air, or any other suitable subset of the pumps can be flooded to cease pumping.

However, any other suitable means of ceasing pumping force application to the reciprocating element 220 can be used.

The valve 860 of the pressure regulation mechanism 800 functions to selectively permit fluid flow into the pump body 240 of the secondary pump 820. The valve 860 preferably has an opening threshold pressure substantially equal to the desired reservoir pressure (e.g., the upper limit of a desired reservoir pressure range), and can additionally have a closing threshold pressure under, over, or equal to the desired reservoir pressure (e.g., the lower limit of a desired reservoir pressure range). The valve 860 can additionally function as a timer, and have a pumping resumption pressure at which primary pump pumping is resumed. The pumping resumption pressure is preferably determined by the ratio of the first and second pressurization areas within the valve. Alternatively, the pressure regulation mechanism 800 can include a timer that functions to delay the resumption of pumping after the closing threshold pressure is reached. The valve 860 is preferably located in the fluid manifold fluidly connecting the second reservoir 500 with the pump body 240. However, the valve 860 can be located within the second reservoir 500 or within the pump body inlet. The opening threshold pressure is preferably a higher pressure than the closing threshold pressure, wherein the opening and closing threshold pressures are preferably determined by the return force applied by the return element. The valve state is preferably determined by the pressure within the second reservoir 500. The pumping resumption pressure is preferably lower than the closing threshold pressure, but can alternatively be higher than the closing threshold pressure or be any suitable pressure. The valve 860 is preferably operable between an open mode when the pressure of the second reservoir 500 exceeds an opening threshold pressure, wherein the valve 860 permits fluid flow from the second reservoir 500 into the pump body 240, and a closed mode when the pressure of the second reservoir 500 is below the closing threshold pressure, wherein the valve 860 prevents fluid flow from the second reservoir 500 into the pump body 240. Pumping by the primary pump 200 is preferably resumed when the pressure within the second pump 820 falls below the pumping resumption pressure, but can alternatively be resumed when the reservoir pressure falls below the closing threshold. The valve 860 is preferably a snap-action valve, but can alternatively be any other suitable valve 860. The valve 860 is preferably passive but can alternatively be active. The valve 860 preferably includes a valve member 864 that seats within a valve body 862, and can additionally include a return mechanism (e.g., a spring) that biases the valve member 864 against the valve body 862. The valve member 864 and valve body 862 can be different materials (e.g., to compensate for material expansion due to temperature changes), or can be made of the same material or materials with similar expansion coefficients.

In one variation of the pressure regulation mechanism 800, the snap-action valve 860 is substantially similar to the valve described in U.S. application Ser. No. 13/469,007 filed 10 May 2012.

Figure 16:
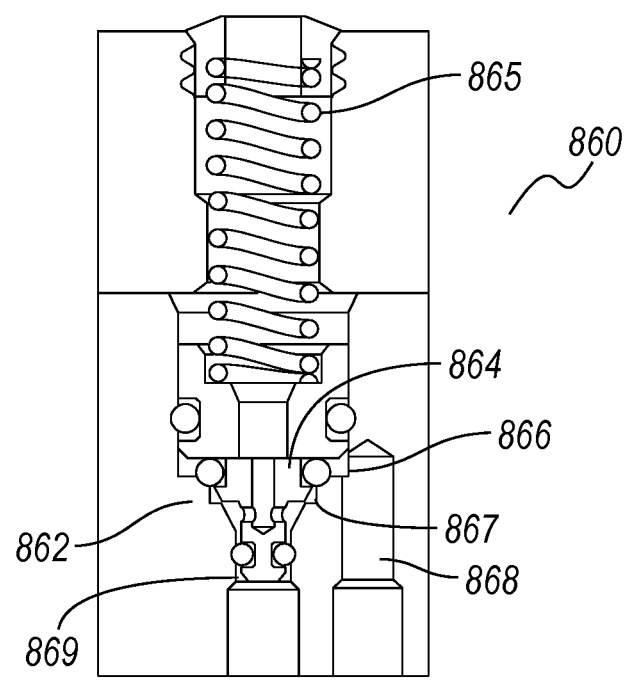
FIG. 16 is a cutaway view of the valve within the pressure regulation mechanism.

In another variation of the pressure regulation mechanism 800, as shown in FIG. 16, the snap-action valve 860 includes a valve body 862, a valve member 864, a spring 865, a first volume 866, a second volume 867, a reservoir channel 868, and a manifold channel 869. The spring or return element 865, biases the valve body 862 against the valve member 864. The spring constant of the spring is preferably selected based on the desired reservoir pressure (threshold pressure or cracking pressure) and the desired valve operating characteristics. The first volume is preferably defined between the valve body 862 and valve member 864, and preferably has a first pressurization area normal to a direction of spring force application. The second volume is preferably also defined between the valve body 862 and valve member 864, and preferably has a second pressurization area normal to the direction of spring force application. The second reservoir channel preferably fluidly connects the first volume with the second reservoir 500. The manifold channel is preferably defined through the valve body 862, and is preferably fluidly connected to the pressure regulation mechanism 800. The manifold channel is preferably defined along the axis of return force application, opposing the return element 260 across the valve member 864, but can alternatively be defined, in any other suitable location. The valve 860 can additionally include a timing channel fluidly coupling the second volume to an ambient environment, wherein the timing channel has a cross section selected based on a desired leak rate. The ratio of the first pressurization area to the second pressurization area is preferably selected based on the desired amount of time the valve 860 takes to recover the closed position, but can alternatively be any suitable ratio. The combined volume of the first and second volumes are preferably substantially insignificant relative to the second reservoir volume. The valve 860 is preferably operable between an open position and closed position. In the open position, the valve body 862 and valve member 864 cooperatively define a connection channel fluidly connecting the first volume with the second volume, wherein the valve member 864 is located distal the valve body 862. The open position is preferably achieved when a pressure force generated by a pressure within the first volume overcomes the spring force applied by the spring on the valve body 862. In the closed mode, the valve member 864 and valve body 862 cooperatively seal the connection channel and the valve member 864 substantially seals the manifold channel, wherein the valve member 864 seats against the valve body 862. The closed mode is preferably achieved when the pressure force is lower than the applied spring force. In one alternative of the valve 860, the valve member 864 has a symmetric cross section including a stem configured to fit within the manifold channel, a first overhang extending from the stem, and a second overhang extending from the first overhang. The valve body 862 includes a cross section complimentary to the valve member cross section, including a first step defining the manifold channel, a second step extending from the first step, and walls extending from the second step. The first volume is preferably defined between the second step and the second overhang, the second volume is preferably defined between the first step and the first overhang, and the connection channel is preferably defined between a transition from the first overhang to the second overhang and a transition between the first step to the second step. The valve 860 can further include gaskets bordering and cooperatively defining the first and second volumes. In one alternative of the valve 860, the valve 860 includes a first gasket located within the connection channel that forms a first substantially fluid impermeable seal with the valve member 864 in the closed mode and a second fluid impermeable seal defined between the second overhang and the walls. The valve 860 can additionally include a gasket within the manifold channel that forms a fluid impermeable seal with the stem when the valve 860 is in the closed mode (e.g., to cooperatively define the second volume), and permits fluid flow therethrough when the valve 860 is in the open mode.

5. Stabilizing Mechanism

Figure 10A:
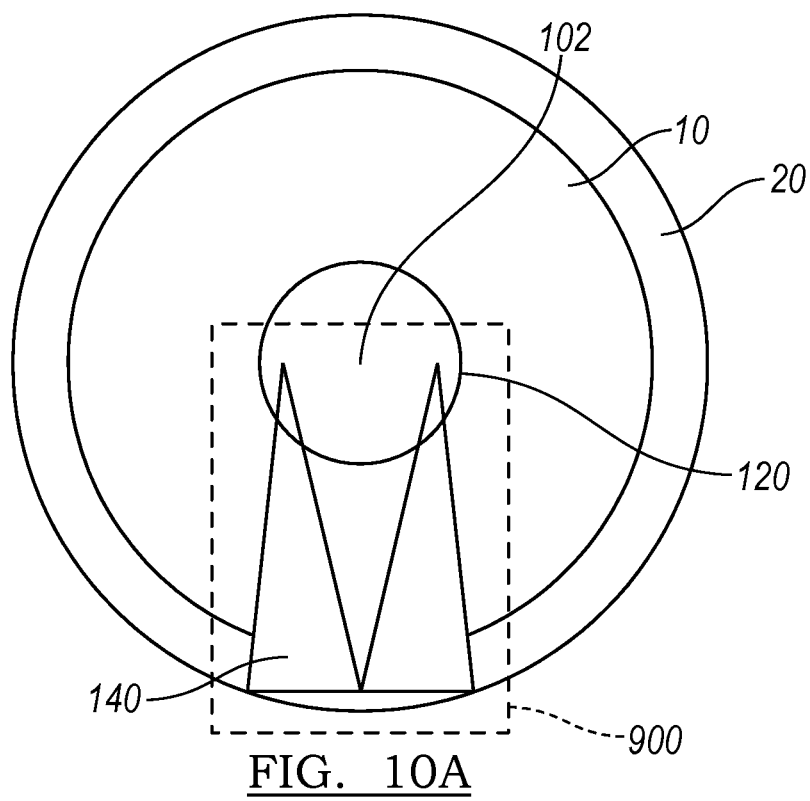
FIGS. 10A and 10B are schematic representations of a variation of the stabilizing mechanism in the pumping and non-pumping modes, respectively.
Figure 10B:
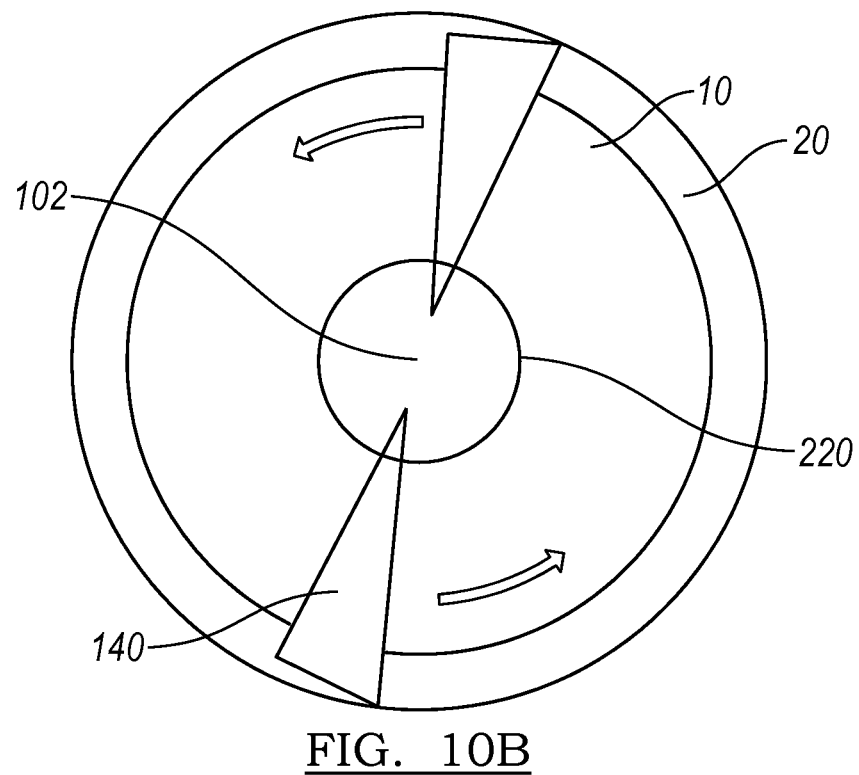

The pump system 10 can additionally include a stabilizing mechanism 900 that functions to reduce rotational surface imbalance when the eccentric mass 140 becomes excited (e.g., begins spinning) when the pump system 10 rotates at or near the excitation frequency of the eccentric mass 140. The stabilizing mechanism 900 is preferably the eccentric mass 140, wherein the eccentric mass 140 is collectively formed from multiple sections. However, the stabilizing mechanism 900 can alternatively be any other suitable stabilizing mechanism 900. When the eccentric mass 140 begins to spin, the composite sections of the eccentric mass separate. This is particularly useful when system oscillations cause the eccentric mass 140 (and positioning mechanism) to spin about the shaft; the centrifugal forces cause the sections of the split eccentric mass 140 to separate and be evenly distributed about the axis of system rotation, as shown in FIGS. 10A and 10B. Not only does this have the effect of dynamically balancing the system and/or rotating surface 20, but the even distribution of the eccentric mass 140 within the system also halts system pumping. The latter effect can allow the eccentric mass 140 to additionally function as a control mechanism, wherein the eccentric mass resonant frequency can be tailored such that pumping is ceased when a predetermined rotation speed or vibration frequency is reached. The multiple sections are preferably each positioned the same radial distance away from the rotational axis (the eccentric mass 140 is radially divided into multiple sections, wherein the multiple sections have different angular positions), but can alternatively be positioned at different radial distances (e.g., wherein the multiple sections have substantially similar angular positions, etc.). The multiple sections preferably share a common plane, wherein the common plane is preferably substantially parallel to the rotational surface. The multiple sections can collectively form an arc, centered about the rotational axis, that intersects the common plane (e.g., the multiple sections are adjacent along an arc), form a block that intersects the common plane, or collectively form any other suitable structure. Alternatively, the multiple sections can be stacked along the thicknesses of the sections, wherein the section thicknesses are preferably parallel to the rotational axis. The multiple sections preferably have substantially the same mass, but can alternatively have different masses. The center of mass for each eccentric mass section is preferably offset from the mass couple connection point for each eccentric mass section, and is preferably arranged proximal an adjacent eccentric mass section. In operation, the eccentric mass sections separate until the centers of mass of the eccentric mass sections oppose each other across the axis of rotation.

Figure 11A:
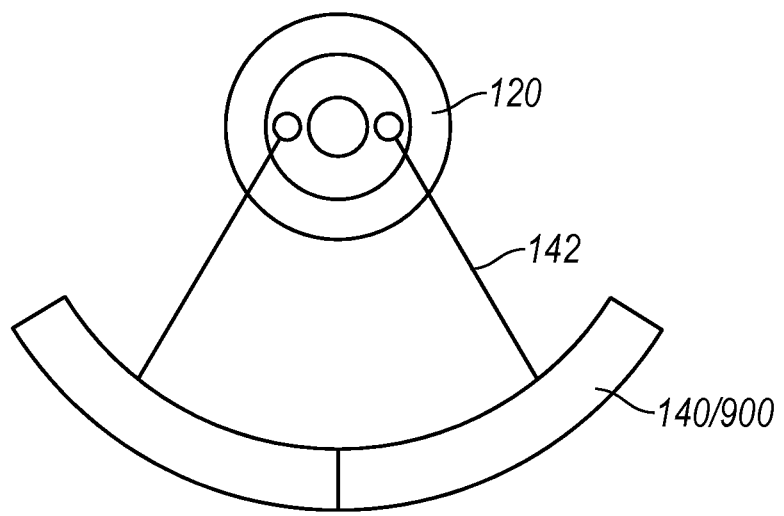
FIGS. 11A and 11B are schematic representations of a second variation of the stabilizing mechanism in the pumping and non-pumping modes, respectively.
Figure 11B:
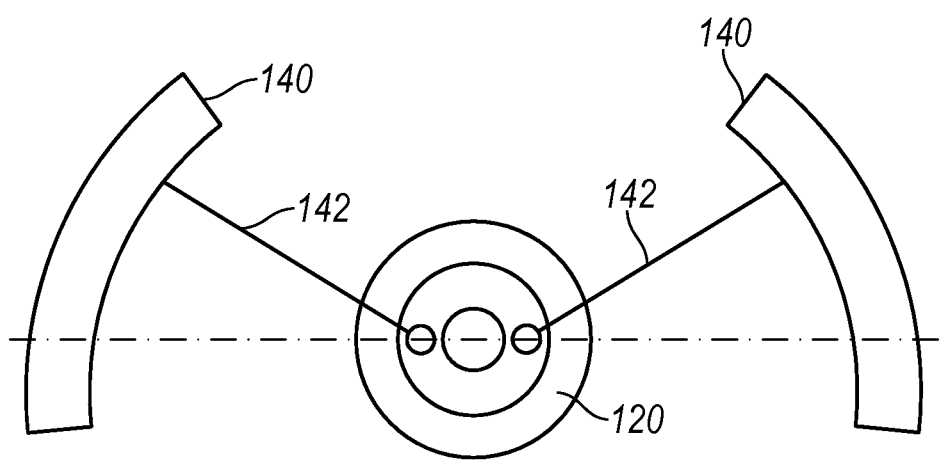

When the eccentric mass 140 is cooperatively formed by multiple sections, the mass couple 142 preferably also includes multiple sections, wherein each mass couple section statically couples to an eccentric mass section. The mass couple sections are preferably rotatably coupled to the cam 120, but can alternatively be statically coupled to the cam 120. Each mass couple section is preferably rotatably coupled to the remaining mass couple sections, but can alternatively be statically coupled to one or more of the remaining mass couple sections. In one variation as shown in FIGS. 11A and 11B, the end of each mass couple section opposing the eccentric mass section is rotatably coupled to the housing. The angular positions of mass couple section ends are preferably static relative to the housing, wherein the mass couple section ends are preferably equally distributed about the axis of rotation. In another variation, the end of the each mass couple section opposing the eccentric mass section includes a bearing, wherein the bearing is slidably engaged within a circumferential groove statically coupled to the cam 120 and encircling the rotational axis. When the rotation frequency of the rotating surface 20 is below or above the excitation frequency for the cooperatively defined eccentric mass 140, the centrifugal force of the rotation preferably retains the eccentric mass sections (and mass couple sections) in substantially adjacent positions. When the rotation frequency of the rotating surface 20 is at the excitation frequency, the centrifugal force preferably causes the bearings to slide within the groove, distributing the multiple eccentric mass sections substantially equally about the rotational axis. The bearings and/or the eccentric mass sections can each additionally include magnets, disposed in repulsive relation to adjacent magnets, which facilitate eccentric mass separation in response to the receipt of a system oscillation. In another variation, the mass couple sections rotatably couple along the longitudinal axis of an axle extending from the cam 120 (e.g., mass couple sections are stacked along the axle). In another variation, one mass couple section is statically connected to the cam 120 while the remaining mass couple sections are rotatably connected to the cam 120. However, the mass couple sections can be otherwise connected to the cam 120.

When the mass couple 142 couples to the cam 120 at the rotational axis, the mass couple 142 is preferably operable between the coupled mode, wherein the mass couple 142 connects the eccentric mass 140 to the cam 120, and the decoupled mode, wherein the mass couple 142 disconnects the eccentric mass 140 from the cam 120. In one variation, the mass couple 142 is a disk located within the lumen defined by an interior bearing surface of the cam 120, wherein the disk can rotate relative to the interior bearing surface in the decoupled mode and is coupled to the interior bearing surface by a friction element in the coupled mode. The mass couple sections are preferably rotatably coupled to the disk, but can alternatively be disk sections (e.g., concentric circles, arcuate pieces, etc.). The friction element can be a high-friction coating along the interior bearing surface, a high-friction coating along the mass couple 142 exterior, a roller or wedge, or any other suitable element capable of providing friction between the interior bearing surface and the mass couple 142. The friction element is preferably selected such that the cooperative centrifugal force of the eccentric mass 140 in the coupled mode applies sufficient force to the mass couple 142 such that the friction between the mass couple 142 and the interior bearing surface retains the mass couple position relative to the cam 120. The friction element is preferably selected such that the cooperative centrifugal force of the eccentric mass sections in a separated or decoupled mode does not provide enough force to interface friction to retain the mass couple position relative to the cam 120, thereby allowing free mass couple rotation. In another variation, the mass couple 142 is rotatably mounted on an axle extending from the cam 120 by bearings, wherein the mass couple 142 can be statically coupled to the cam 120 by one or more sets of magnets or pistons extending from the adjacent broad faces of the cam 120 and mass couple 142. However, the static mass couple connection to the cam 120 to achieve the coupled mode can be selectively controlled by any other suitable passive or active means.

The eccentric mass 140 can additionally include a connection mechanism that functions to couple the multiple sections together. The connection mechanism is preferably located on the interfaces of adjacent sections, but can alternatively be located within the section bodies, at the interfaces of adjacent mass couple sections, or at any other suitable location. The coupling force of the connection mechanism is preferably selected such that it is substantially equal to or lower than the angular separation force experienced by the individual eccentric mass sections when the system is rotating at the excitation frequency. However, the coupling force can have any other suitable magnitude. The connection mechanism can be a mechanical connection (e.g., adhesive, clips, Velcro, etc.) with a separation force substantially equivalent to the coupling force, a magnetic connection wherein adjacent eccentric mass or mass couple sections include complimentary magnets, or any other suitable mechanism that can selectively connect adjacent eccentric mass sections together.

In one alternative, the eccentric mass 140 is collectively formed by a first and a second section (e.g., the eccentric mass 140 is divided radially into two sections), wherein the first section is a reflected duplication of the second section. In operation, the first and second sections are preferably diametrically opposed and spin about the axis of rotation of the positioning mechanism when the system vibration reaches the resonance frequency of the eccentric mass 140. In a second alternative, the eccentric mass 140 is collectively formed by a first, second, and third section with substantially the same mass, wherein the first, second and third sections are preferably substantially evenly distributed about the rotational axis when the system rotational speed reaches the resonance frequency of the eccentric mass 140. However, the eccentric mass 140 can be formed from any number of constituent sections in any suitable configuration. Alternatively, the stabilizing mechanism 900 can be any other suitable mechanism.

The pump system 10 can additionally include a damping mechanism that functions to minimize oscillations of the eccentric mass 140 within the system. Oscillations of the eccentric mass 140 can result in eccentric mass excitation, wherein the eccentric mass 140 spins within the system instead of remaining substantially static relative to a gravity vector. Oscillations can arise from irregularities in the rolling surface (e.g., the road), dynamic unbalance (e.g., due to wheel mass distribution.), the pumping pulse (e.g., when the pumping pulse occurs at a frequency that excites the mass), or can arise from any suitable mechanism that can generate oscillations of the eccentric mass 140.

In a first variation, the damping mechanism includes Dynabeads or other dynamic balancing mechanisms located within an internal channel encircling the rotational axis. In a second variation, the damping mechanism is a torsional mass-spring system, wherein the resonant vibration period of the mass-spring system is preferably matched to the gravitationally induced resonant frequency of the eccentric mass 140 oscillation. The torsion spring is preferably coupled to the cam 120 such that the eccentric mass 140 oscillations cause an inertial transfer, which excites the torsional mass-spring system into resonance at a phase shift that is 180 degrees out of phase with the oscillations of the eccentric mass 140. The torsion spring is preferably coupled between the torsional mass and the cam 120, but can alternatively be positioned between the cam 120 and the mass couple 142, or in any suitable position.

6. Example Pump System

In one embodiment of the pump system 10, as shown in FIGS. 12A and 12B, the pump system 10 includes a first and a second reciprocating pump (200a and 200b, respectively), a drive mechanism 100, a first and a second force translator (300a and 300b, respectively) connected to the first and second reciprocating pumps, respectfully, the first and second force translators having a first and second axis in fixed relation, respectively, a fluid manifold 202 fluidly connecting the second reciprocating pump to a reservoir 500, and a valve 860 located within the fluid manifold 202. The first pump 200a preferably includes an outlet fluidly connected to the second reservoir 500, wherein the first pump 200a pumps fluid to and pressurizes the second reservoir 500. The first pump 200a preferably includes an inlet fluidly connected to a fluid source, wherein the fluid source can be the ambient environment, the housing (e.g., wherein the housing encloses desiccated air), or any other suitable fluid source. The second pump 200b can additionally include an inlet (separate from that coupled to the fluid manifold 202 but alternatively the same one) and outlet fluidly connected to the fluid source and reservoir, respectively, wherein the second pump 200b can pump fluid to and pressurize the second reservoir 500. Alternatively, the inlet and outlet of the second pump 200b can be fluidly connected to the fluid source and to the inlet of the first pump 200, respectively, thereby forming a two-stage pump. In this alternative, fluid is pressurized to a first pressure within the second pump 200b and pressurized to a second pressure at the first pump 200a. The first and second reciprocating pumps preferably include a first and second pump body (240a and 240b), respectively, and a first and second reciprocating element (220a and 220b), respectively. The first and second reciprocating pumps preferably share a common plane (e.g., the respective actuating axes share a common plane), but can alternatively be located in different planes. The first and second reciprocating pumps are preferably equally radially distributed about the drive mechanism 100, more preferably equally distributed about the rotational axis of the drive mechanism 100. However, the pumps can be otherwise distributed. The positions of the first and second pump bodies are preferably statically fixed by a housing or other component, wherein the housing statically couples the pump system 10 to a rotating surface 20 and can additionally enclose the pump system 10. The first and second reciprocating pumps preferably oppose each other, wherein the closed end of the first pump body 240a is distal the closed end of the second pump body 240b and the first reciprocating element 220a is proximal the second reciprocating element 220b. The first reciprocating element 220a preferably has a first pressurization area (area that receives or generates a pressure force) and the second reciprocating element 220b preferably has a second pressurization area. The first pressurization area is preferably smaller than the second pressurization area, but can alternatively be larger or smaller. The drive mechanism 100 preferably includes a rotational axis 102, a cam 120 rotatable about the rotational axis, the cam 120 having a bearing surface 122, and an eccentric mass 140 coupled to the cam 120 that offsets the center of mass of the drive mechanism 100 from the rotational axis. The first force translator 300a is preferably couplable to the bearing surface 122 of the cam 120 in non-slip contact, and is preferably statically connected to the reciprocating element 220 of the first pump along an axis (e.g., rotational axis). The second force translator 300b preferably slips relative to the bearing surface 122 of the cam 120, but can alternatively couple in non-slip contact with the bearing surface 122. The second force translator 300b is preferably statically connected to the reciprocating element 220 of the second pump along an axis (e.g., rotational axis). The first and second force translators can each be a roller, a piston, a piston coupled to the roller at the rotational axis, or any other suitable force translator. The positions of the first and second force translators are preferably statically retained by a frame 880, but can alternatively be retained by any other suitable mechanism. The frame 880 preferably encloses the drive mechanism 100, such that the drive mechanism 100 is located within the area bounded by the frame 880. However, the frame 880 can be otherwise arranged relative to the drive mechanism 100. The frame 880 is preferably located in the common plane shared by the first and second pumps, but can alternatively be located in a separate plane (e.g., extend normal to said plane and extend along a second plane parallel to the first). In operation, a radial or linear position of the frame 880 preferably shifts from a first position to a second position relative to a point on the drive mechanism 100 (e.g., rotational axis) when second reciprocating element 220 moves from the depressurized position to the pressurized position, respectively. The distance between the first position and the second position is preferably substantially similar to the distance between the depressurized position and the pressurized position, but can alternatively be larger (e.g., wherein the frame 880 amplifies the change in reciprocating element position) or smaller. Frame 880 movement preferably results in simultaneous first and second force translator movement, coupling the first force translator 300a to the drive mechanism 100 in the first position and decoupling the first force translator 300a from the drive mechanism 100 in the frame's second position. Alternatively, frame movement can result in first and second reciprocating pump movement relative to the drive mechanism 100, wherein the frame 880 statically connects the positions of the first and second pump bodies. However, the force translators can be otherwise connected and disconnected to the drive mechanism 100. The frame 880 can additionally include features, such as arcuate grooves on the surface of the frame 880 proximal the drive mechanism 100, which facilitate second force translator 300b slip relative to the bearing surface 122. The fluid manifold preferably fluidly connects the second reservoir 500 to an inlet of the second pump, but can additionally fluidly connect the second reservoir 500 to an inlet of the first pump. In the latter alternative, the valve is preferably located upstream of the junction between the three fluid connections or within the junction. In this latter alternative, valve opening simultaneously floods both lumens of the first and second reciprocating pumps. Because the second reciprocating pump preferably has a larger pressurization area than the first reciprocating pump, the second reciprocating pump preferably exerts a linear (e.g., radial) decoupling force on the frame 880, which is transferred by the frame 880 into a shift in the position of the first force translator 300a away from the drive mechanism 100, effectively decoupling the first force translator 300a from the drive mechanism 100.

As a person skilled in the art will recognize from the previous detailed description and from the figures and claims, modifications and changes can be made to the preferred embodiments of the invention without departing from the scope of this invention defined in the following claims.

We claim:

1. A tire inflation system configured to mount to and inflate a tire supported by a wheel comprising:
    a housing configured to statically couple to the wheel;
    a drive mechanism that rotates relative to the housing, the drive mechanism having a rotational axis, the drive mechanism comprising:
        a) a cam comprising an arcuate bearing surface having a non-uniform curvature, the cam rotatable about the rotational axis; and
        b) an eccentric mass coupled to the cam that offsets a center of mass of the drive mechanism from the rotational axis and operable between:
            a first mode, wherein the eccentric mass is substantially statically coupled to the cam; and
            a second mode, wherein the eccentric mass is configured to rotate relative to the cam;
    a pump cavity statically mounted to the housing positioned a radial distance away from the axis of rotation and rotatably coupled to the drive mechanism, such that the pump cavity rotates relative to the cam, the pump cavity comprising an actuating element and a chamber; and
    a force translator coupling the arcuate bearing surface to the actuating element, the force translator comprising an axis having an arcuate position about the rotational axis fixed to an arcuate position of the pump cavity about the rotational axis, such that the force translator rotates with the pump cavity about the drive mechanism.

2. The tire inflation system of claim 1, wherein the axis of the force translator comprises a second rotation axis, wherein an arcuate position of the second rotation axis about the rotational axis is fixed relative to the arcuate position of the pump cavity about the rotational axis.

3. The tire inflation system of claim 2, wherein the force translator comprises a roller in non-slip contact with the arcuate bearing surface of the cam.

4. The tire inflation system of claim 3, wherein the force translator further comprises a piston rotatably connected to the rotation axis, wherein the actuating element comprises the piston.

5. The tire inflation system of claim 4, wherein the actuating element comprises a diaphragm.

6. The tire inflation system of claim 1, wherein the arcuate bearing surface has a first section having high curvature adjacent a second section having low curvature.

7. The tire inflation system of claim 6, wherein the arcuate bearing surface further comprises a third section between the first and second sections, the third section having curvature varying from a low curvature proximal the second section to a high curvature proximal the first section.

8. The tire inflation system of claim 7, wherein the arcuate bearing surface comprises an outer perimeter of the cam.

9. The tire inflation system of claim 6, further comprising a torque stabilization mechanism configured to accommodate a force of the actuating element on the cam during a return stroke.

10. The tire inflation system of claim 9, wherein the drive mechanism further comprises a mass couple operable in:
   a coupled mode wherein the mass couple connects the eccentric mass to the cam; and
   a decoupled mode wherein the mass couple disconnects the eccentric mass from the cam.

11. The tire inflation system of claim 10, wherein the mass couple couples to an interior bearing surface of the cam, wherein:
   in the coupled mode, the mass couple is statically coupled to an interior bearing surface of the cam, and
   in the decoupled mode, the mass couple is rotatably coupled to the interior bearing surface.

12. The tire inflation system of claim 10, wherein the torque stabilizing mechanism comprises a profiled channel defined between the interior bearing surface and the mass couple, the profiled channel having a low clearance section and a high clearance section, the torque stabilizing mechanism further comprising a mobile element having a dimension substantially equal to the low clearance section and smaller than the high clearance section, the mobile element located within the profiled channel, wherein the torque stabilizing mechanism switches the mass couple between:
   the coupled mode, wherein the mobile element is located in the low clearance section and retains a position of the mass couple with the interior bearing surface; and
   the decoupled mode, wherein the mobile element is located in the high clearance section and permits relative motion between the mass couple and the interior bearing surface.

13. The tire inflation system of claim 12, wherein the high clearance section is substantially radially aligned with the first section of the arcuate bearing surface.

14. The tire inflation system of claim 1, further comprising a second pump cavity comprising a second actuating element and a second chamber; and a second force translator coupling the arcuate bearing surface to the second actuating element, the second force translator comprising a second axis having a second arcuate position fixed to an arcuate position of the second pump cavity.

15. The tire inflation system of claim 14, further comprising a passive pressure regulation system comprising a passive valve fluidly connected to a reservoir, the reservoir fluidly connected to an outlet of the first pump cavity, the passive valve having a opening threshold pressure and a closing threshold pressure lower than the opening threshold pressure, the passive valve operable between:
   an open mode in response to a reservoir pressure exceeding the opening threshold pressure, wherein the passive valve permits fluid flow from the reservoir; and
   a closed mode in response to a reservoir pressure falling below the closing threshold pressure, wherein the passive valve prevents fluid flow from the reservoir.

16. The tire inflation system of claim 15, wherein the passive pressure regulation system further comprises a fluid manifold fluidly connecting the first pump cavity, the second pump cavity, and a reservoir fluidly coupled to the first and second pump cavities, wherein the passive valve is located within the fluid manifold, wherein:
   in the open mode, the passive valve permits fluid flow from the reservoir to the first and second pump cavities; and
   in the closed mode, the passive valve prevents fluid flow from the reservoir to the first and second pump cavities.

17. The tire inflation system of claim 16, wherein the second actuating element comprises a larger actuating area than the first actuating element.

18. The tire inflation system of claim 17, wherein an inlet to the first pump cavity is fluidly connected to an outlet from the second pump cavity.

19. The tire inflation system of claim 16, further comprising a frame statically connecting the first axis with the second axis, the frame operable between:
   a pumping position wherein the frame places the first force translator in non-slip contact with the arcuate bearing surface, wherein the second force translator is connected to the arcuate bearing surface through the first force translator and the frame; and
   a non-pumping position, wherein the frame disconnects the first force translator from the arcuate bearing surface and slidably couples the second force translator to the arcuate bearing surface.

20. The tire inflation system of claim 19, wherein a frame center is located at a first radial position in the pumping position and at a second radial position in the non-pumping position, wherein the first radial position is different from the second radial position.

21. The tire inflation system of claim 19, wherein the second pump cavity is operable between:
   a compressed position wherein the second actuating element is substantially proximal a closed end of the second chamber;
   a recovered position wherein the second actuating element is located at a first position distal a closed end of the second chamber; and
   a pressurized position wherein the second actuating element is located at a second position distal the chamber, the second position further from the chamber than the first position, wherein the second actuating element is placed in the pressurized position in response to a pressure of the reservoir surpassing the opening pressure, wherein the frame is placed in the non-pumping position when the second pump cavity is placed in the pressurized position.

22. The tire inflation system of claim 1, further comprising the housing coupled to the drive mechanism and the pump cavity, the housing configured to statically mount to a rotating surface, the rotating surface configured to rotate relative to a gravity vector.

23. The tire inflation system of claim 22, comprising a relief valve operable between an open state wherein the relief valve fluidly connects a reservoir to a housing interior, the reservoir fluidly connected to an outlet of the pump cavity, and a closed state wherein the relief valve substantially prevents fluid flow from the reservoir to the housing interior.

24. The tire inflation system of claim 1, wherein the eccentric mass comprises a first and a second piece, the eccentric mass operable between:
   a pumping mode wherein the first piece is adjacent the second piece; and
   a non-pumping mode wherein the first piece is distal the second piece.

* * * * *